United States Patent
Said et al.

(10) Patent No.: US 11,490,083 B2
(45) Date of Patent: Nov. 1, 2022

(54) LEARNED LOW-COMPLEXITY ADAPTIVE QUANTIZATION FOR VIDEO COMPRESSION

(71) Applicant: QUALCOMM Incorporated, San Diego, CA (US)

(72) Inventors: Amir Said, San Diego, CA (US); Reza Pourreza, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/166,639

(22) Filed: Feb. 3, 2021

(65) Prior Publication Data
US 2021/0243442 A1    Aug. 5, 2021

Related U.S. Application Data

(60) Provisional application No. 62/970,588, filed on Feb. 5, 2020.

(51) Int. Cl.
  *H04N 19/124*   (2014.01)
  *H04N 19/176*   (2014.01)
  *G06N 20/00*    (2019.01)
  *H04N 19/186*   (2014.01)
  *H04N 19/18*    (2014.01)

(52) U.S. Cl.
  CPC .......... *H04N 19/124* (2014.11); *G06N 20/00* (2019.01); *H04N 19/176* (2014.11); *H04N 19/18* (2014.11); *H04N 19/186* (2014.11)

(58) Field of Classification Search
  CPC .... H04N 19/124; H04N 19/176; H04N 19/18; H04N 19/186; G06N 20/00
  See application file for complete search history.

(56) References Cited

U.S. PATENT DOCUMENTS

| | | | |
|---|---|---|---|
| 8,767,822 B2 | 7/2014 | Zuo et al. | |
| 9,510,002 B2 | 11/2016 | Tourapis et al. | |
| 9,521,410 B2 | 12/2016 | Seregin et al. | |
| 9,560,386 B2 | 1/2017 | Valin et al. | |
| 2007/0140334 A1* | 6/2007 | Sun ...................... | H04N 19/126 375/240.03 |
| 2008/0219354 A1* | 9/2008 | Segall ................... | H04N 19/40 375/240.23 |
| 2010/0061449 A1 | 3/2010 | Cote et al. | |
| 2012/0063691 A1 | 3/2012 | Yu et al. | |

(Continued)

OTHER PUBLICATIONS

Ma et al. arXiv:1904.03567v2 [cs.CV] Apr. 10, 2019 (Year: 2019).*

(Continued)

*Primary Examiner* — Jae N Noh
(74) *Attorney, Agent, or Firm* — Shumaker & Sieffert, P.A.

(57) ABSTRACT

A video encoder may determine a set of quantization offset parameters for a group of scaled transform coefficients for a block of video data based on side information associated with the block of video data. The video encoder may further quantize the group of scaled transform coefficients for the block of video data to generate quantized transform coefficients for the block of video data based at least in part on the set of quantization offset parameters. The video encoder may further generate an encoded video bitstream based at least in part on the quantized transform coefficients for the block of video data.

53 Claims, 12 Drawing Sheets

(56) References Cited

U.S. PATENT DOCUMENTS

| | | | |
|---|---|---|---|
| 2012/0177109 A1* | 7/2012 | Ye | H04N 19/124 375/240.03 |
| 2015/0071345 A1* | 3/2015 | Tourapis | H04N 19/70 375/240.03 |
| 2019/0132591 A1 | 5/2019 | Zhang et al. | |
| 2021/0329267 A1 | 10/2021 | Kianfar | |

OTHER PUBLICATIONS

Bengio Y., et al., "Modeling High-Dimensional Discrete Data with Multi-Layer Neural Networks", NIPS'99: Proceedings of the 12th International Conference on Neural Information Processing Systems, Nov. 1999, pp. 400-406.

Bross B., et al., "Versatile Video Coding (Draft 10)", JVET-S2001-vA, Joint Video Experts Team (JVET) of ITU-T SG 16 WP 3 and ISO/IEC JTC 1/SC 29/WG 11, 19th Meeting: by Teleconference, Jun. 22-Jul. 1, 2020, 550 Pages.

Bross B., et al., "Versatile Video Coding (Draft 8)", Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET- Q2001-VE, 515 Pages.

Bross B., et al., "Versatile Video Coding (Draft 8)", Joint Video Experts Team (JVET) of ITU-T SG 16 WP 3 and ISO/IEC JTC 1/SC 29/WG 11, 17th Meeting, Brussels, BE, Jan. 7-17, 2020, JVET-Q2001-vA, 519 Pages.

Canh T.N., et al., "Rate-Distortion Optimized Quantization: A Deep Learning Approach", IEEE High Performance Extreme Computing Conference, 2018, 4 pages.

Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), No. JVET-A1001, Feb. 24, 2016 (Feb. 24, 2016), XP030150000, 27 Pages, URL: http://phenix.int-evry.fr/jvet/.

Chen Y., et al., "An Overview of Core Coding Tools in the AV1 Video Codec", Proceedings of 33rd Picture Coding Symposium, San Francisco, CA, Jun. 2018, 5 pages.

Guleryuz O.G., et al., "Non-Causal Encoding of Predictively Coded Samples", Proceedings of IEEE International Conference on Image Processing, Paris, France, Sep. 2014, pp. 4812-4816.

Hu J-H., et al., "Reinforcement Learning for HEVC/H.265 Intra-Frame Rate Control", IEEE International Symposium on Circuits and Systems (ISCAS), 2018, 5 pages.

Ioffe S., et al., "Batch Normalization: Accelerating Deep Network Training by Reducing Internal Covariate Shift", International Conference on Machine Learning, Mar. 2, 2015, pp. 1-11, arXiv:1502.03167v3.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Karczewicz M., et al., "Rate Distortion Optimized Quantization", 34th VCEG Meeting, 83rd MPEG Meeting, Jan. 12, 2008-Jan. 13, 2008, Antalya, Turkey (Video Coding Experts Group of ITU-T SG.16), No. VCEG-AH21, Jan. 9, 2008, XP030003559A, pp. 1-3, ISSN: 0000-0138.

Karczewicz M., et al., "R-D Based Quantization in H.264", Proceedings of SPIE, Applications of Digital Image Processing XXXII, San Diego, vol. 7443, Sep. 2009, pp. 744314-1-744314-8.

Kianfar D., et al., "Parallelized Rate-Distortion Optimized Quantization Using Deep Learning", IEEE, 2020, 5 pages.

Larochelle H., et al., "The Neural Autoregressive Distribution Estimator", Journal of Machine Learning Research, Jan. 2011, pp. 29-37.

Laude T., et al., "Deep Learning-Based Intra Prediction Mode Decision for HEVC", 2016 Picture Coding Symposium (PCS), IEEE, Dec. 2016, 6 Pages.

Long J., et al., "Fully Convolutional Networks for Semantic Segmentation", 2015 IEEE Conference on Computer Vision and Pattern Recognition (CVPR), vol. abs/1411.4038v2, Mar. 8, 2015 (Mar. 8, 2015), 10 pages, XP055294644, ISBN: 978-1-4673-6964-0 the whole document.

Mukherjee D., et al., "The Latest Open-Source Video Codec VP9—An Overview and Preliminary Results", Proceedings of 30th Picture Coding Symposium, San Jose, CA, Dec. 2013, 4 pages.

Pearlman W.A., et al., "Digital Signal Compression: Principles and Practice", Cambridge University Press, 2011, 439 pages.

Ramchandran K., et al., "Bit Allocation for Dependent Quantization with Applications to Multiresolution and MPEG Video Coders", IEEE Transactions on Image Processing, vol. 3, No. 5, Sep. 1994, pp. 533-545.

Ramchandran K., et al., "Rate-Distortion Optimal Fast Thresholding with Complete JPEG/MPEG Decoder Compatibility", IEEE Transactions on Image Processing, IEEE Service Center, Piscataway, NJ, US, vol. 3, No. 5, Sep. 1, 1994, pp. 700-704.

Richardson I.E., "The H.264 Advanced Video Compression Standard", Second Edition, John Wiley and Sons, Ltd., Aug. 9, 2010, 337 pages.

Said A., et al., "Improving Hybrid Coding Via Control of Quantization Errors in the Spatial and Frequency Domains", Proceedings of IEEE International Conference on Image Processing, Paris, France, Sep. 2014, pp. 5621-5625.

Schaal S., et al., "Is Imitation Learning the Route to Humanoid Robots?", Trends in Cognitive Sciences, vol. 3, 1999, 233-242, 19 Pages.

Schwartz E., et al., "DeepISP: Toward Learning an End-to-End Image Processing Pipeline", IEEE Transactions on Image Processing, vol. 28, No. 2, Feb. 2019, pp. 912-923.

Srivastava, N., et al., "Dropout: A Simple Way to Prevent Neural Networks from Overfitting", Journal of Machine Learning Research, vol. 15, No. 1, Jun. 2014, pp. 1929-1958.

Sullivan G.J., et al., "On Dead-Zone Plus Uniform Threshold Scalar Quantization", Proceedings of SPIE 5960, Visual Communications and Image Processing, Beijing, China, vol. 5960, 2005, pp. 596033-1-596033-12.

Sullivan G.J., et al., "Overview of the High Efficiency Video Coding (HEVC) Standard", IEEE Transactions on Circuits and Systems for Video Technology, vol. 22, No. 12, Dec. 2012, pp. 1649-1668.

Taubman D., et al., "JPEG2000: Image Compression Fundamentals, Standards and Practice", Springer, 2002, 779 pages.

U.S. Appl. No. 17/070,589, filed Oct. 14, 2020.

Wiegand T., et al., "Lagrange Multiplier Selection in Hybrid Video Coder Control", Proceedings of IEEE International Conference on Image Processing, Thessaloniki, Greece, vol. 3, Oct. 2001, pp. 542-545.

Wien M., "High Efficiency Video Coding, Coding Tools and specification", Chapter 5, Springer-Verlag, Berlin, 2015, 30 pages.

Wiggers A., et al., "Predictive Sampling with Forecasting Autoregressive Models", Proceedings of the 37th International Conference on Machine Learning, 2020, 10 Pages.

Woods J.W., "Multidimensional Signal, Image, and Video Processing and Coding", 2nd ed., Academic Press, May 2011, 217 pages.

Xu M., et al., "Simplified Rate-Distortion Optimized Quantization for HEVC", IEEE International Symposium on Broadband Multimedia Systems and Broadcasting (BMSB), 2018, 5 Pages.

Xu M., et al., "Reducing Complexity of HEVC: A Deep Learning Approach", IEEE Transactions on Image Processing, Oct. 2018, pp. 1-17.

Zhang Z-T., et al., "Efficient CTU-based Intra Frame Coding for HEVC Based on Deep Learning", Proceedings of APSIPA Annual Summit and Conference 2017, Dec. 12-15, 2017, pp. 661-664.

Zhang, Y., et al., "Fast rate distortion optimized quantization for HEVC," In Proc. Visual Comm. Image Proces., pp. 1-4, 2015.

Cui, J., et al., "Hybrid laplace distribution-based low complexity rate-distortion optimized quantization," IEEE Transactions on Image Processing, vol. 26, No. 8, pp. 3802-3816, Aug. 2017.

Kingma, D. P., et al., "Adam: A method for stochastic optimization," arXiv preprint arXiv:1412.6980, 2014. 4. D. Engelhardt, J. Moller, J. Hahlbeck, and B. Stabernack, "Fpga implementation of a full hd real-time hevc main profile decoder," IEEE Transactions on Consumer Electronics, vol. 60, No. 3, pp. 476-484, 2014.

(56) References Cited

OTHER PUBLICATIONS

Engelhardt, D., et al., "Fpga implementation of a full hd real-time hevc main profile decoder," IEEE Transactions on Consumer Electronics, vol. 60, No. 3, pp. 476-484, Aug. 2014.
Technical Information of EBU Test Sequences "Ebu uhd-1 test sequences," version 3.0, Geneva, Mar. 2015, downloaded from https://tech.ebu.ch/testsequences/uhd-1.
Bossen, F., et al., "JVET Common Test Conditions and Software Reference Configurations for SDR Video," JVET-N1010-v1, Joint Video Experts Team (JVET) of ITU-T SG 16 WP 3 and ISO/IEC JTC 1/SC 29/WG 11, 14th Meeting: Geneva, CH, Mar. 19-27, 2019, 6 Pages.
Gong W., et al., "Progressive Image Transmission Using Self-Supervised Backpropagation Neural Network", Signals, Systems and Computers, 1991, 1991 Conference Record of the Twenty-Fifth Asilomar Conference on Pacific Grove, CA, USA Nov. 4-6, 1991, Los Alamitos, CA, USA,IEEE Comput, Soc, US, Nov. 4, 1991 (Nov. 4, 1991), XP010026476, pp. 1133-1137, DOI: 10.1109/ACSSC. 1991.186624 ISBN: 978-0-8186-2470-4 abstract section "3 Neural Transmission Sequence" section "4.2 Quantization".
International Search Report and Written Opinion—PCT/US2021/016576—ISA/EPO—dated Apr. 9, 2021 18 Pages.
Sullivan G., "Adaptive Quantization Rounding Offset", 14 JVT Meeting; 71. MPEG Meeting; Jan. 18, 2005-Jan. 21, 2005; Hong Kong, CN; (Joint Video Team of ISO/IEC JTC1/SC29/WG11 and ITU-TSG.16), No. JVT-N011, Jan. 18, 2005-Jan. 21, 2005, 9 Pages, Jan. 13, 2005 (Jan. 13, 2005), XP030005934, the whole document.
Zhou M., et al., "Compact Representation of Quantization Matrices for HEVC", 4. JCT-VC Meeting; 95, MPEG Meeting; Jan. 20, 2011-Jan. 28, 2011; Daegu; Korea (Joint Collaborative Team on Video Coding of ISO/IEC JTC1/SC29/wg11 and ITU-T SG.16); URL: http://wftp3.itu.int/av-arch/jctvc-site/, Jan. 15, 2011, No. JCTVC-D024, Jan. 15, 2011 (Jan. 15, 2011), WG 11 No. m18763, ISSN 0000-0015, XP030008065, pp. 1-9, the whole document.

* cited by examiner

4x4 BLOCK

8x8 BLOCK

16x16 BLOCK

32x32 BLOCK

LEARNED LOW-COMPLEXITY ADAPTIVE QUANTIZATION FOR VIDEO COMPRESSION

This application claims the benefit of U.S. Provisional Application No. 62/970,588, filed Feb. 5, 2020, which is hereby incorporated by reference in its entirety.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for adaptive quantization of transform coefficients for encoding video data by determining quantization offsets for quantizing the transform coefficients. Specifically, instead of quantizing transform coefficients based on bit cost estimates for optimally quantizing the transform coefficients that are determined for entropy coding of quantized transform coefficients, a video encoder may determine a set of quantization offset parameters for a group of transform coefficients in a block of video data based on side information associated with the block of video data and may quantize the group of transform coefficients based on the set of quantization offset parameters to generate nearly-optimal quantized transform coefficients.

In accordance with the techniques of this disclosure, a video encoder may split transform coefficients of a block of video data into groups of transform coefficients. The video encoder may determine, for each group of transform coefficients, a set of quantization offset parameters associated with the group of transform coefficients based on side information for the block of video data, such as the slice type of the block of video data, and/or an indication of whether the block of video data comprises a luminance or chrominance component. The video encoder may therefore quantize each group of transform coefficients based on the quantization offset parameters associated with the group of transform coefficients, with performance improvement based on the selection of best offsets.

The technical problems solved by the techniques of this present disclosure are related to the fact that the entropy coding performed by modern video encoders may be very complex, with many arithmetic coding contexts and complex context-selection rules. Furthermore, modern video encoders may encode transform coefficients in multiple passes. For instance, the entropy coding in modern video encoders can be done in up to 5 passes. This makes computing and using bit cost estimates for optimally quantizing transform coefficients potentially complicated and computationally expensive for each decision.

In contrast, by refraining from utilizing bit cost estimates for quantizing the transform coefficients that are determined during entropy coding of quantized transform coefficients in order to quantize transform coefficients, the techniques of this disclosure improve compression with lower computational complexity of quantizing transform coefficients, thereby enabling the video encoder to utilize fewer processing cycles in order to quantize transform coefficients. Further, because the techniques of this disclosure may determine a single set of quantization offsets that are used to quantize each transform coefficient within a group of transform coefficients, the techniques of this disclosure enable the video encoder to quantize transform coefficients within a group of transform coefficients in parallel (e.g., the video encoder may quantize transform coefficients within a first group of transform coefficients at the same time or overlapping in time with quantizing transform coefficients within a second group of transform coefficients).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method of encoding video data. The method includes determining a set of quantization offset parameters for a group of scaled transform coefficients for a block of video data based on side information associated with the block of video data. The method further includes quantizing the group of scaled transform coefficients for the block of video data to generate quantized transform coefficients for the block of video data based at least in part on the set of quantization offset parameters. The method further includes generating an encoded video bitstream based at least in part on the quantized transform coefficients for the block of video data.

One general aspect includes a device for encoding video data. The device includes a memory. The device further includes processing circuitry in communication with the memory, the processing circuitry being configured to: determine a set of quantization offset parameters for a group of scaled transform coefficients for a block of video data based on side information associated with the block of video data; quantize the group of scaled transform coefficients for the block of video data to generate quantized transform coefficients for the block of video data based at least in part on the set of quantization offset parameters; and generate an encoded video bitstream based at least in part on the quantized transform coefficients for the block of video data.

One general aspect includes an apparatus for decoding video data. The apparatus includes means for determining a set of quantization offset parameters for a group of scaled transform coefficients for a block of video data based on side information associated with the block of video data. The apparatus further includes means for quantizing the group of scaled transform coefficients for the block of video data to generate quantized transform coefficients for the block of video data based at least in part on the set of quantization offset parameters. The apparatus further includes means for generating an encoded video bitstream based at least in part on the quantized transform coefficients for the block of video data.

One general aspect includes a computer-readable storage medium having stored thereon instructions that when executed by one or more processors cause the one or more processors to: determine a set of quantization offset parameters for a group of scaled transform coefficients for a block of video data based on side information associated with the block of video data; quantize the group of scaled transform coefficients for the block of video data to generate quantized transform coefficients for the block of video data based at least in part on the set of quantization offset parameters; and generate an encoded video bitstream based at least in part on the quantized transform coefficients for the block of video data.

The details of one or more examples are set forth in the accompanying drawings and the description below. Other features, objects, and advantages will be apparent from the description, drawings, and claims.

DETAILED DESCRIPTION

Figure 1:
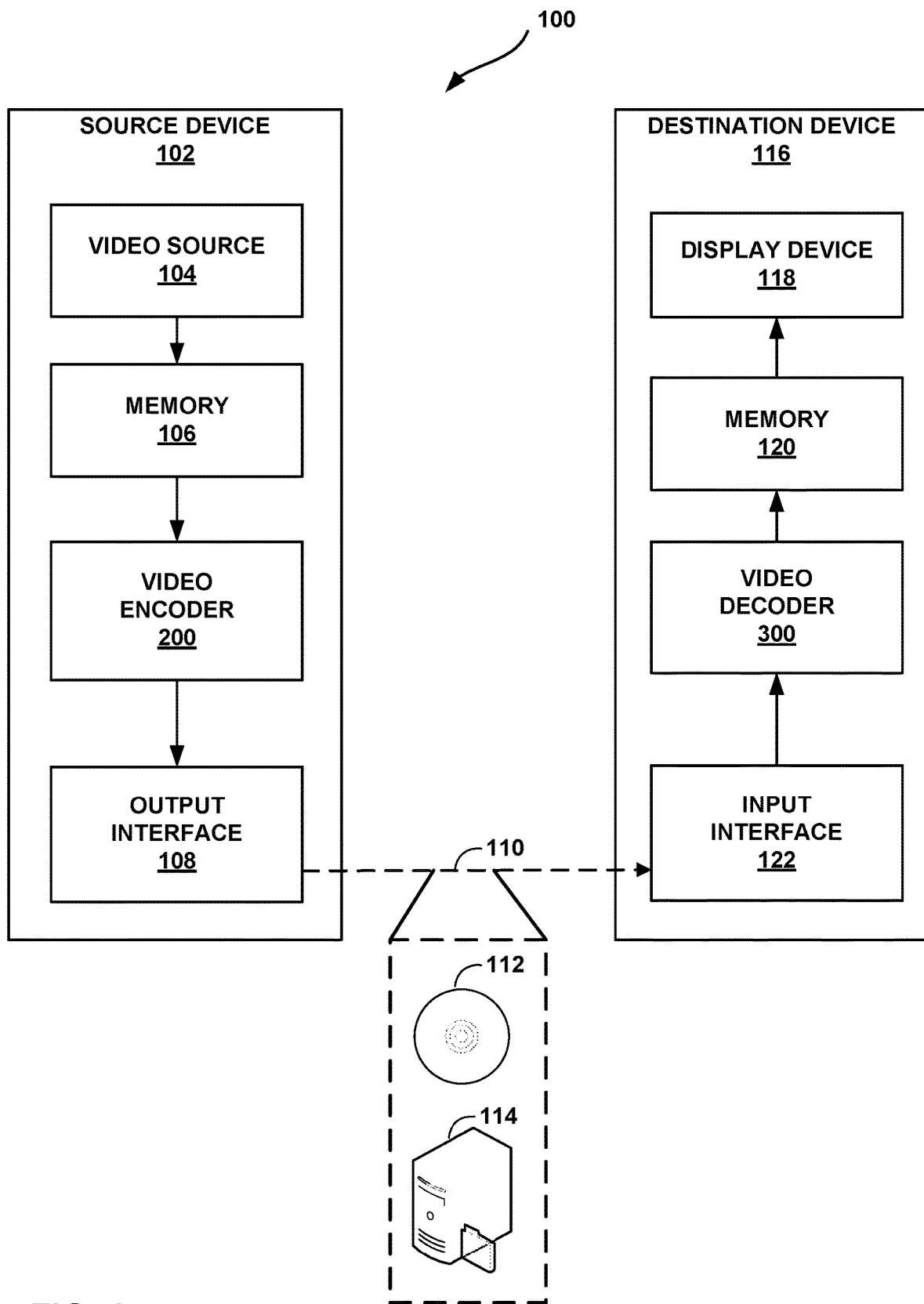
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for quantizing transform coefficients. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for quantizing transform coefficients. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, tiles, bricks, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, 18$^{th}$ Meeting: by teleconference, 22 Jun.-1 July 2020, JVET-S2001-vA (hereinafter "VVC Draft 10") as available under https://jvet-experts.org/. The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions. The techniques of this disclosure, however, are not limited to a YUV representation but may be applied to an RGB presentation with three color components.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that composes a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce a block, such as a transform block (TB) or transform coefficient block, of transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

In accordance with aspects of this disclosure, video encoder 200 may split transform coefficients for a block of pixels or samples, such as a transform block, into groups of transform coefficients. Video encoder 200 may determine, for each group of transform coefficients, a set of quantization offset parameters associated with the group of transform coefficients based on side information for the block of video pixels or samples. Video encoder 200 may quantize each group of transform coefficients based on the set of quantization offset parameters associated with the respective group of transform coefficients.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data. The side information for the block of video data may be syntax data associated with the block of video data, e.g. block-based syntax data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a prediction mode (intra- or inter-prediction) that may be signaled in the bitstream and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 may determine a set of quantization offset parameters for a group of scaled transform coefficients for a block of video data based on side information associated with the block of video data, quantize the group of scaled transform coefficients for the block of video data to generate quantized transform coefficients for the block of video data based at least in part on the set of quantization offset parameters, and generate an encoded video bitstream based at least in part on the quantized transform coefficients for the block of video data.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
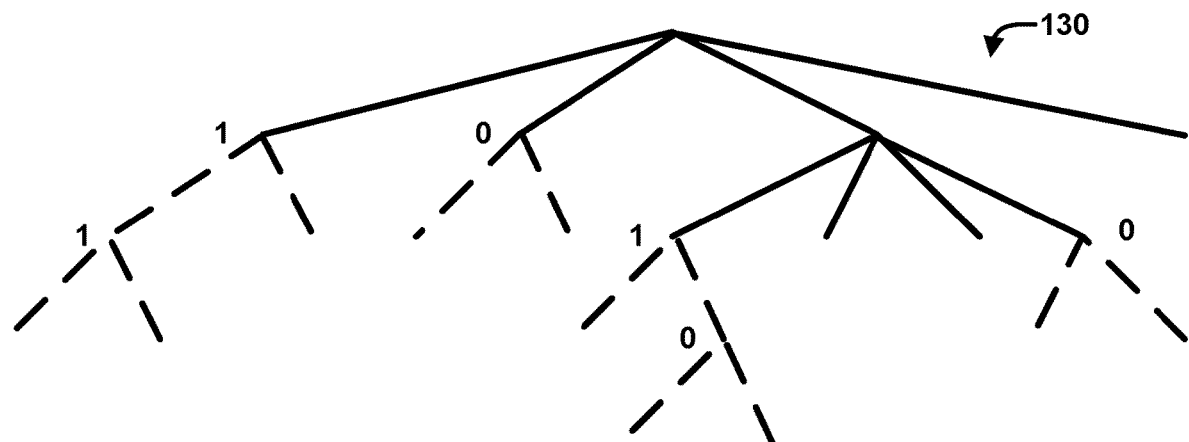
FIGS. 2A and 2B are conceptual diagrams illustrating an example quadtree binary tree (QTBT) structure, and a corresponding coding tree unit (CTU).
Figure 2B:
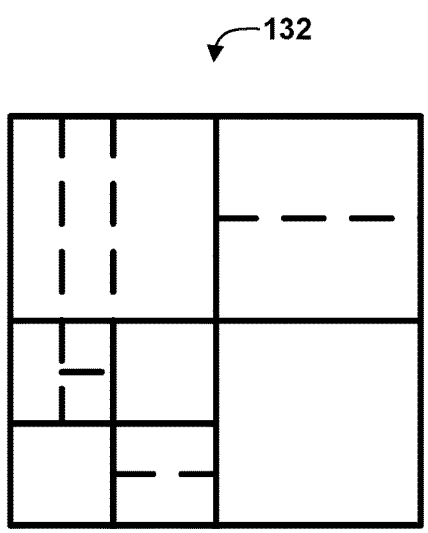

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level (i.e., the first level) of QTBT structure 130 (i.e., the solid lines) and syntax elements (such as splitting information) for a prediction tree level (i.e., the second level) of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the quadtree leaf node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies that no further vertical splitting is permitted. Similarly, a binary tree node having a height equal to MinBTSize implies that no further horizontal splitting is permitted for that binary tree node. As noted above, leaf nodes of the binary tree are referred to as CUs, and are further processed according to prediction and transform without further partitioning.

Figure 8:
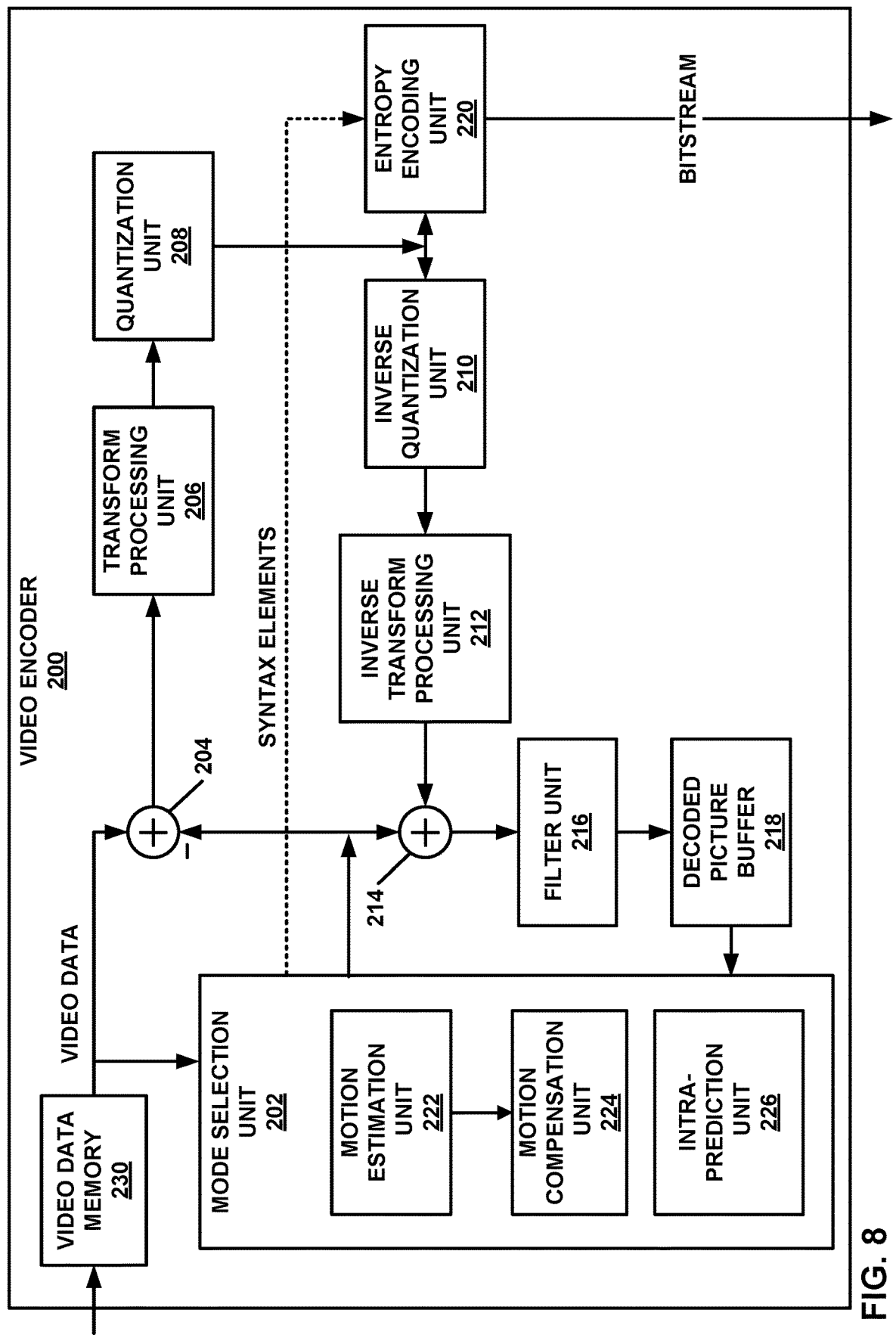
FIG. 8 is a block diagram illustrating an example video encoder that may perform the techniques of this disclosure.

As described throughout this disclosure, aspects of this disclosure describe determining a plurality of quantization offset vectors for a plurality of transform coefficients based at least in part on scaled transform coefficients for the current block and side information, and quantizing the transform coefficients to generate quantized transform coefficients for the current block based at least in part on the plurality of quantization offset vectors. One or more of these example techniques, and the example techniques described below may be performed by video encoder 200. In particular, the techniques described below may be performed by, for example, transform processing unit 206 and quantization unit 208 of video encoder 200 as shown in FIG. 8. In some examples, the techniques may be performed by video decoder 300.

Figure 9:
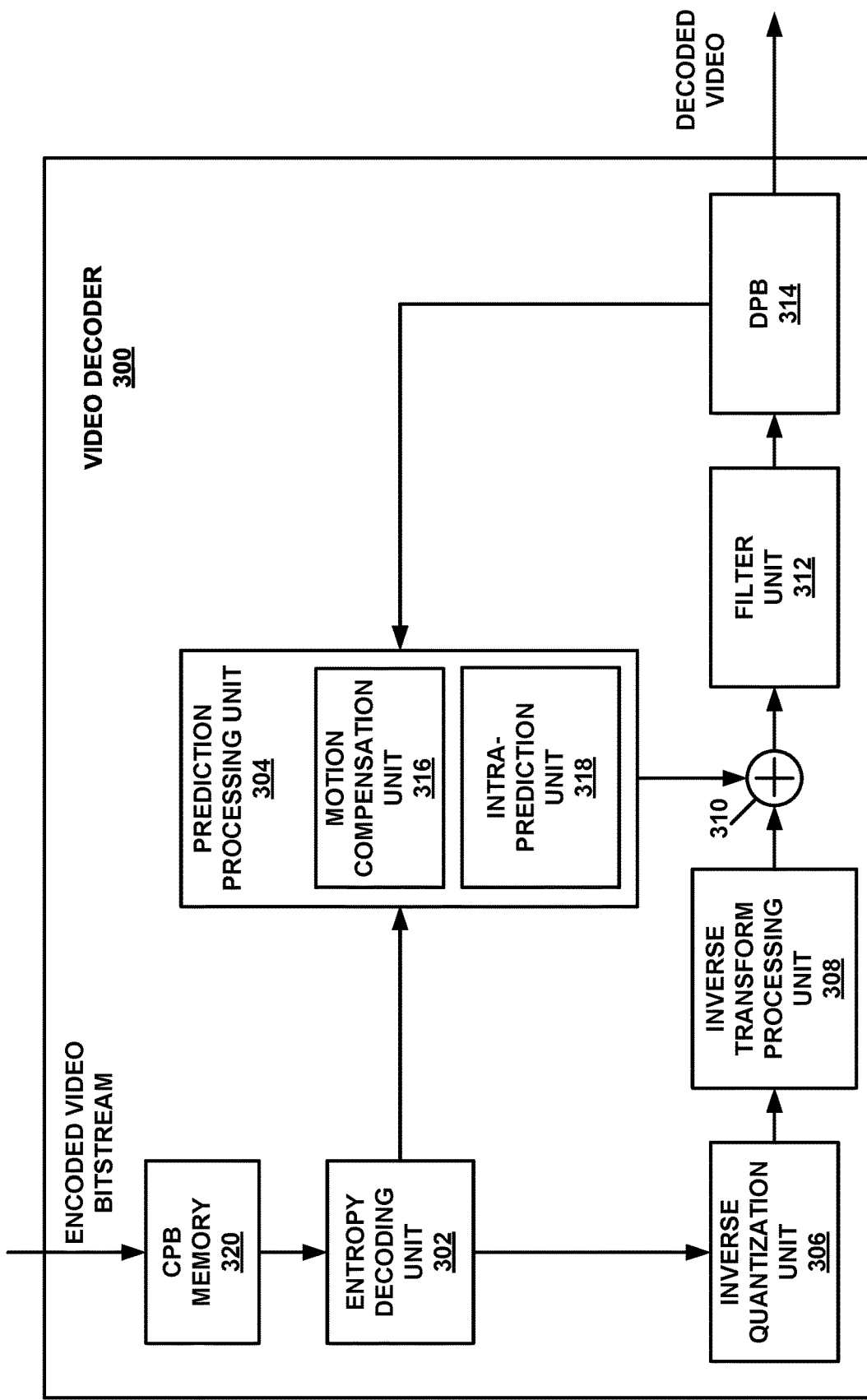
FIG. 9 is a block diagram illustrating an example video decoder that may perform the techniques of this disclosure.

To minimize decoder costs, video compression standards like H.264/AVC, H.265/HEVC, VP9 and AV1 use a quantization scheme where only the dequantization (video decoder 300's inverse quantization unit 306 as shown in FIG. 9) is normative and is defined to have the simplest and least expensive implementation. This allows encoder designers to choose among different quantization methods for video encoder 200, considering the compromise between optimizing compression performance and minimizing encoder costs. Details of some example quantization schemes can be found in I. E. Richardson, "The H.264 Advanced Video Compression Standard", $2^{nd}$ ed., John Wiley and Sons Ltd., 2010; M. Wien, "High Efficiency Video Coding: Coding Tools and Specification", Springer-Verlag, Berlin, 2015; D. Mukherjee, J. Bankoski, R. S. Bultje, A. Grange, J. Han, J. Koleszar, P. Wilkins, and Y. Xu, "The latest open-source video codec VP9—an overview and preliminary results," in Proc. 30th Picture Coding Symp., San Jose, Calif., December 2013; and Y. Chen, D. Murherjee, J. Han, A. Grange, Y. Xu, Z. Liu, S. Parker, C. Chen, H. Su, U. Joshi, C. Chiang, Y. Wang, P. Wilkins, J. Bankoski, L. Trudeau, N. Egge, J. Valin, T. Davies, S. Midtskogen, A. Norkin, P. de Rivaz, "An Overview of core coding tools in the AV1 video codec", in Proc. 33th Picture Coding Symp., San Francisco, Calif., June 2018.

There are known techniques for improving quantization that, when compared to straightforward scalar quantization, can yield substantial coding gains. However, one or more of these known techniques for improving quantization may have a high computational complexity. Such high computational complexity may be acceptable for video-on-demand encoders, but may be too computationally expensive for real-time video encoders. Furthermore, these techniques may be based on strictly sequential computations, which can strongly limit the video encoder's throughput.

This disclosure presents example techniques to potentially solve one or more of these problems. However, the example techniques described in this disclosure should not be construed as limited to solving the problem or only solving the problem of high computational complexity and strictly sequential computations.

Aspects of this disclosure describe heuristic quantization techniques that may provide significant coding gains with the low computational complexity required for real-time encoders. These techniques are based on machine-learning frameworks that "short-cut" the optimization decisions. Instead of basing the quantization decisions on per-coefficient bit rate values that are nearly exact, but may be computationally very expensive to compute, the example techniques described in this disclosure may use training data to learn estimates of bit rates that are shared by several coefficients together, which may efficiently translate into improved quantization choices.

Experimental simulations, using one version of the techniques fully implemented, show results that are comparable to the technique used in the reference HEVC Test Model (HM) codec, but with much lower computational complexity, and with straightforward and efficient parallel implementations. Using the VVC common test conditions, the new technique described herein provides a gain of 4.88%, 3.24%, 4.50%, and 4.44% in the all-intra, random access, low-delay B, and low-delay P, which are better than HEVC Test Model (HM)'s rate-distortion optimized quantization (RDOQ) technique, except for random access.

Quantization is a component of all lossy video compression techniques, since quantization is the stage of the video coding process that defines the bit usage versus the acceptable "loss" of the signal being compressed. That is, quantization defines what part of the original media signal is to be discarded, to achieve a desired compressed data size. Some aspects of quantization are described in I. E. Richardson, "The H.264 Advanced Video Compression Standard", $2^{nd}$ ed., John Wiley and Sons Ltd., 2010; M. Wien, "High Efficiency Video Coding: Coding Tools and Specification", Springer-Verlag, Berlin, 2015; D. Mukherjee, J. Bankoski, R. S. Bultje, A. Grange, J. Han, J. Koleszar, P. Wilkins, and Y. Xu, "The latest open-source video codec VP9—an overview and preliminary results," in Proc. 30th Picture Coding Symp., San Jose, Calif., December 2013; Y. Chen, D. Murherjee, J. Han, A. Grange, Y. Xu, Z. Liu, S. Parker, C. Chen, H. Su, U. Joshi, C. Chiang, Y. Wang, P. Wilkins, J. Bankoski, L. Trudeau, N. Egge, J. Valin, T. Davies, S. Midtskogen, A. Norkin, P. de Rivaz, "An Overview of core coding tools in the AV1 video codec", in Proc. 33th Picture Coding Symp., San Francisco, Calif., June 2018; J. W. Woods, "Multidimensional Signal, Image, and Video Processing and Coding", $2^{nd}$ ed., Academic Press, 2011; W. A. Pearlman and A. Said, "Digital Signal Compression: Principles and Practice", Cambridge University Press, 2011; and D. Taubman, W. Marcellin, "JPEG2000: Image Compression Fundamentals, Standards and Practice", Springer, 2002.

When used together with orthogonal transforms, video encoder 200 and video decoder 300 can compute nearly-uniform-reconstruction quantization (NURQ) by simply using some form of rounding at video encoder 200, and potentially only a multiplication (scalar scaling) and possibly one addition at video decoder 300. Some aspects of NURQ are described in G. J. Sullivan and S. Sun, "On dead-zone plus uniform threshold scalar quantization," in Proc. SPIE 5960, Visual Communications and Image Processing, Beijing, China, 2005.

Figure 3A:
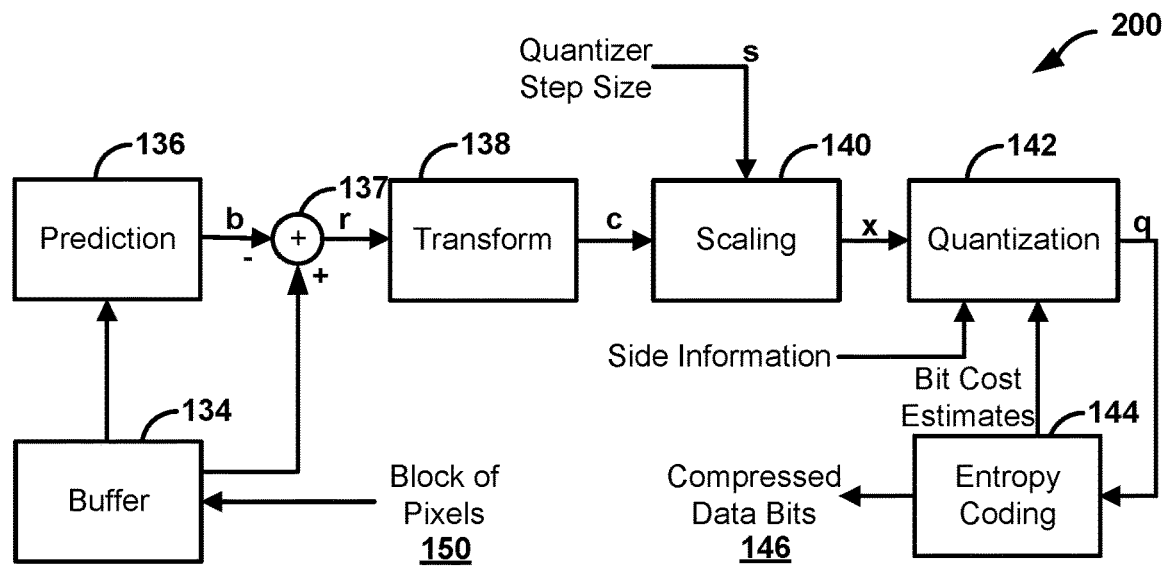
FIG. 3A illustrates a video coding system for adaptive and/or rate-distortion optimized quantization.

FIG. 3A shows a video coding system with adaptive and/or rate-distortion optimized quantization. In particular, FIG. 3A illustrates the main components of a video encoder, such as video encoder 200, in a hybrid video coding system, such as video encoding and decoding system 100, and provides examples of some of the terminology and notation used throughout this disclosure. Even though the video encoding process uses pixels organized in two-dimensional blocks, this disclosure may in some examples, describe data used in the video encoding process as N-dimensional vectors, in order to simply the notation of the data described herein.

Video encoder 200 may include buffer 134 that receives and stores block of pixels 150, such as pixels of video data, for encoding. Prediction unit 136 may generate prediction block b from the block of pixels 150. Residual generation unit 137 may generate residual data r based on prediction block b and block of pixels 150. Transform unit 138 may generate transform coefficients c based on the residual data r. Scaling unit 140 may scale transform coefficients c based on a quantizer step size s to determine scaled transform coefficients x. Quantization unit 142 may quantize scaled transform coefficients x based on bit cost estimates from entropy coding engine 144 and side information to generate quantized transform coefficients q. Entropy coding engine 144 may generate an encoded video bitstream that includes compressed data bits 146 based on the quantized transform coefficients q.

Using the notation illustrated in FIG. 3A, assuming a quantizer with scaling factor (quantization step size) s, a vector $x \in \mathbb{R}^N$ that represents scaled transform coefficients can be defined as $$x = \frac{1}{s} c. \qquad (1)$$

where c represents transform coefficients prior to scaling, and where s is the quantizer step size.

NURQ quantization is defined with two parameters, p and u, where u is a quantization offset and $\lfloor . \rfloor$ is the function floor(.), and is computed using $$q_i = \text{sign}(x_i) \max(0, \lfloor |x_i| + u - p \rfloor), \qquad (2)$$

and the inverse of NURQ quantization is defined by $$\hat{c}_i = s \, \text{sign}(q_i)(|q_i| + p), \qquad (3)$$

where $$\text{sign}(z) = \begin{cases} -1, & z < 0, \\ 0, & z = 0, \\ 1, & z > 0. \end{cases} \qquad (4)$$

Since this simple but effective approach has very small implementation costs, it was adopted by all the first media compression standards and is still commonly chosen for real-time encoders. The H.264/AVC and H.265/HEVC standards have the normative rule that equation (3) with p=0 must be used by video decoder 300. Unless stated otherwise, this disclosure assumes that video decoder 300 may use parameter p=0 to dequantize quantization values.

Since quantization defines an aspect of lossy compression—which is the trade-off between resulting degradation of reproduction quality and number of bits used (distortion and bit rate)—a truly optimal form of quantization may take into account all the factors that affect rate and distortion (R-D) not only for each scalar being quantized, but for all vectors simultaneously. This potentially makes the problem of optimal quantization extraordinarily complex, and it may be necessary to identify and deal with only the most important and manageable factors in order to simplify quantization for practical applications in real-life video encoders.

There are several practical approaches that have been proposed for improving quantization, and that have shown to yield significant coding gains (compression improvements), such as: use of vector quantization, such as described in W. A. Pearlman and A. Said, "Digital Signal Compression: Principles and Practice", Cambridge University Press, 2011 and D. Taubman, W. Marcellin, "JPEG2000: Image Compression Fundamentals, Standards and Practice", Springer, 2002; effective modeling of quantization interaction with predictive coding, such as described in A. Said, O. G. Guleryuz, and S. Yea, "Improving hybrid coding via control of quantization errors in the spatial and frequency domains," in Proc. IEEE Int. Conf. Image Process., Paris, France, September 2014 and O. G. Guleryuz, A. Said, and S. Yea, "Non-causal encoding of predictively coded samples," in Proc. IEEE Int. Conf. Image Process., Paris, France, September 2014; and per-coefficient determination of optimal integer values using a rate-distortion cost function.

However, in practice, when compared to the simplest forms of quantization, these approaches may cause relatively large increases in computational complexity and implementation costs. In fact, some mathematical quantization optimization problems may be computationally intractable. As such, solutions that are not necessarily optimal, but sufficiently good for compression, may be much easier to determine and may be more practically implemented by a hybrid video coding system, such as video encoding and decoding system 100.

Aspects of the present disclosure describe techniques that use information from several coefficients for better performance which, in a sense, is a form of vector quantization, and then apply per-coefficient rules, to allow parallel computations, and to achieve computational complexity that may be sufficiently low for real-time video encoders.

Adaptive quantization is described below. One feature of video coding is that data statistics can change very significantly depending on the type of prediction residual being coded, the quality settings, the video features, etc. Thus, adaptive forms of quantization can improve compression by using different parameters according to the expected type of statistics.

The easiest form of adaptation may be based on only encoder settings and state, since those are readily available. For instance, reference implementations of H.264/AVC and H.265/HEVC use equation (2) with offset parameter $u=\frac{1}{3}$ for slices with intra-frame only prediction (I-slices), and otherwise use offset parameter $u=\frac{1}{6}$.

Adaptation can be extended using statistical analysis of the data being coded, such as described in G. J. Sullivan and S. Sun, "On dead-zone plus uniform threshold scalar quantization," in Proc. SPIE 5960, Visual Communications and Image Processing, Beijing, China, 2005. However, those empiric techniques may be very limited because such techniques do not consider how quantization decisions affect the bit rates.

Rate-distortion based quantization is described below. Techniques for modifying quantization to consider both distortion and bit counts have been proposed, being compatible with even some very early compression standards like JPEG and MPEG-2. Some of these techniques are described in K. Ramchandran and M. Vetterli, "Rate-distortion optimal fast thresholding with complete JPEG/MPEG decoder compatibility", IEEE Trans. on Image Processing, Vol. 3, No. 5, September 1994 and K. Ramchandran, A. Ortega and M. Vetterli, "Bit allocation for dependent quantization with applications to multiresolution and MPEG video coders," IEEE Trans. on Image Processing, Vol. 3, No. 5, September 1994.

The optimal quantization problem is defined by the minimization of a distortion function, constrained by an upper bound on the bit rate, and averaged over all video blocks. Since blocks are quantized and coded independently, the problem can be solved using a Lagrange multiplier $\lambda$, such as described in K. Ramchandran and M. Vetterli, "Rate-distortion optimal fast thresholding with complete JPEG/MPEG decoder compatibility", IEEE Trans. on Image Processing, Vol. 3, No. 5, September 1994. For that reason, this disclosure describes the problem of optimizing the quantization in a video block directly in that form.

Given vector x from equation (1), and a vector $q \in \mathbb{Z}^N$ with quantized transform coefficient values, functions $D_s(x, q)$ and $B(q)$ can be defined that measure, respectively, the distortion resulting from the quantization and the number of bits required to entropy code vector q. When the transform is orthogonal and the distortion corresponds to squared-error, quantization is optimal in the rate-distortion sense if it is solved by the following optimization problem:

$$\min_{q \in \mathbb{Z}^N} \{D_s(x, q) + \lambda B(q)\} = \min_{q \in \mathbb{Z}^N} \left\{ \sum_{i=1}^{N} [s(x_i - q_i)]^2 + \lambda B(q) \right\} \quad (5)$$

Due to the complexity constraints, no general methods for optimization problems with integer variables may be available in a practical video encoder to exactly solve the optimization problem depicted by equation (5), and it may be necessary to employ heuristic methods to solve the optimization problem.

One useful tool for dealing with such problems is to test how much the objective function changes when a single element of the solution vector q changes from one integer value to another. To formally represent this, element-wise replacement operator $\mathcal{R}_m^i$ is defined such that $$g = \mathcal{R}_m^i q \Rightarrow g_k = \begin{cases} m, & k = i, \\ q_k, & k \neq i, \end{cases} \quad k = 1, 2, \ldots, N, \quad (6)$$

and the difference operator $\Delta_{m,n}^i$, such that $$\Delta_{m,n}^i B(q) \stackrel{def}{=} B(\mathcal{R}_m^i q) - B(\mathcal{R}_n^i q), \quad (7)$$

$$\Delta_{m,n}^i D_s(x, q) \stackrel{def}{=} D_s(x, \mathcal{R}_m^i q) - D_s(x, \mathcal{R}_n^i q) = s^2(m + n - 2x_i)(m - n). \quad (8)$$

and $$\Delta_m^i, C_{s,\lambda}(x, q) \stackrel{def}{=} \quad (9)$$

$$\Delta_{m,n}^i D_s(x, q) + \lambda \Delta_{m,n}^i B(x) = s^2(m + n - 2x_i)(m - n) + \lambda \Delta_{m,n}^i B(x)$$

In general $$\Delta_{m,n}^i(\bullet) = -\Delta_{n,m}^i(\bullet)$$

With these definitions, heuristic optimization methods can be designed so that, instead of using the exact values of B(q), approximations $\tilde{r}(x)$ are used to compute $$\Delta_{m,n}^i \tilde{c}_{s,\lambda}(x,q) = \Delta_{m,n}^i D_s(x,q) + \lambda \Delta_{m,n}^i \tilde{r}(x) \quad (10)$$

and change q accordingly whenever a negative value is encountered. This type of algorithm, such as described in M. Karczewicz, P. Chen, Y. Ye, and R. Joshi, "R-D based quantization in H.264," in Proc. SPIE 7443, Applications of Digital Image Processing XXXII, September 2009, is implemented in the reference software of the H.265/HEVC standard and is called Rate-Distortion Optimized Quantization (RDOQ). Note that, despite the name, the quantization may not truly be optimized, since RDOQ uses approximations and a non-exact (heuristic) optimization technique.

Some properties can be used for reducing the number of times equation (10) is computed. For instance, since statistical distributions of transform coefficients decrease monotonically with magnitude, the expectation is to have $$|m| \geq |n| \Rightarrow E_{a.e.}\{\Delta_{m,n}^i B(q)\} \geq 0,$$

where the notation $E_{a.e.}\{\bullet\}$ is used to denote that this is expected in all blocks, but there may be some rare exceptions.

HEVC sign-bit hiding is described below. The H.265/HEVC video coding standard includes a technique called sign-bit-hiding, such as described in § 8.2.4 of M. Wien, "High Efficiency Video Coding: Coding Tools and Specification", Springer-Verlag, Berlin, 2015. In particular, the H.265/HEVC video coding standard specifies that, for quantized transform coefficient groups that satisfy a condition for a minimum number of non-zero elements, the parity of the sum of quantized magnitudes must be equal to the sign-bit of the first nonzero coefficient. In this way, the sign bit does not have to be encoded, thereby reducing the total number of encoded bits.

In some examples, when the quantized coefficients do not satisfy the parity condition (50% of the cases, on average), it may be possible to find a coefficient that can have its quantized value incremented or decremented by one, without a large change in distortion. Thus, the scalar quantization on the HEVC HM software implements this technique by searching for the allowed change corresponding to the smallest increase in squared-error distortion.

When RDOQ is enabled, then the search is based on the full R-D cost estimates, and the index k of the coefficient that is to have its quantized value modified can be computed using $$k = \underset{i \in A}{\operatorname{argmin}}\{\min(\Delta^i_{q_i+1,q_i}\tilde{c}_{s,\lambda}(x, q), \Delta^i_{q_i-1,q_i}\tilde{c}_{s,\lambda}(x, q))\}, \quad (11)$$

where A is the set of indexes where the quantization value can be changed. There may be additional implementation steps.

Some techniques for potentially solving some of the above-described problems are now described. As described above, quantization can very effectively be made adaptive and partially optimized if quantization uses some method to accurately measure how the number of encoded bits varies with changes in the quantizer's decisions.

One potential problem may be that modern encoders use quite elaborate entropy coding, with many arithmetic coding contexts and complex context-selection rules. Furthermore, transform coefficients are encoded in more than one pass. For instance, the entropy coding in H.265/HEVC can be done in up to 5 passes. This makes computing and using those bit-cost estimates potentially complicated and computationally expensive for each decision.

Aspects of the present disclosure describe techniques that potentially solve these problems by eliminating the need to derive, for each non-zero transform coefficient, the indexes of the arithmetic coding contexts used for entropy coding the transform coefficient and the need to access the state of those arithmetic coding contexts. Aspects of the present disclosure describe techniques in which an estimation rule is computed once and used in the quantization of several transform coefficients, thereby reducing the average complexity per pixel, and enabling parallel computation of quantized transform coefficients.

In some aspects, video encoder 200 may determine a set of quantization offset parameters for quantizing a group of transform coefficients. The quantization offsets in the set of quantization offset parameters may be variable rather than fixed, and may depend upon the quantization interval, and may be a function of the value of transform coefficients in the group of transform coefficients (e.g., the magnitude of the transform coefficients), the side information associated with a block of transform coefficients that include the group of transform coefficients, values from other blocks of transform coefficients, and the like.

Additional examples of rate-distortion analysis are described below. The rate-distortion equations analyzed for quantization optimization are commonly in the form of equations (5) or (9), which are also used in computational implementations of quantization. One potential problem for the intuitive interpretation of those equations is that they contain the Lagrange multiplier factor λ, which has values that can vary in a very broad range, depending on the choices of reproduction quality.

While values of λ are independent of other encoder decisions, the values of λ may directly relate to the choice of quantizer's step size s, as described in T. Wiegand and B. Girod, "Lagrange multiplier selection in hybrid video coder control," in Proc. IEEE Int. Conf. Image Process., Thessaloniki, Greece, 2001, vol. 3, pp. 542-545. This may mean that, to have a quantization that has rate-distortion compatible with λ, we may define it as $$\lambda = \frac{s^2}{\alpha}, \quad (12)$$

where α varies in a relatively small range. For instance, the HEVC HM software defines α as:

$$\alpha_{HEVC} = \frac{2^{8/3}}{0.57} = 11.14. \quad (13)$$

The substitution of λ in equation (9) with λ as defined in equation (12) results in a normalized form of R-D cost changes:

$$\Delta^i_{m,n}C(x, q) \overset{def}{=} \frac{\Delta^i_{m,n}C_{s,\lambda}(x, q)}{2s^2} = \left(\frac{m+n}{2} - x_i\right)(m-n) + \frac{\Delta^i_{m,n}B(q)}{2\alpha}. \quad (14)$$

Note that equation (14) is directly derived from the objective function of equation (5), i.e., there are no approximations or special assumptions, only normalization and explicit use of the squared-error distortion, to enable more intuitive interpretations.

The special case m=n+1

$$\Delta^i_{n+1,n}C(x, q) = n + \frac{1}{2} - x_i + \frac{\Delta^i_{n+1,n}B(q)}{2\alpha}, \quad (15)$$

shows, in a direct and more intuitive way, that the choice of quantization value n+1 may be better than n only if equation (15) is non-negative, which is equivalent to $$x_i \geq n + \frac{1}{2} + \frac{\Delta^i_{n+1,n}B(q)}{2\alpha}. \quad (16)$$

From equation (16), if $\Delta_{n+1,n}^i(q) \approx 0$, then optimal quantization generally corresponds to rounding operations (equation (2) with parameters p=0, u=½). In the following, this disclosure describes how equation (16) is used to obtain a more general form that is also similar to the quantization defined by equation (2).

Improved quantization with trained Quantization Offset Vectors (QOVs) is described below. One of the potential difficulties of using equation (14) in its exact form is in the computation of changes in bit counts $\Delta_{m,n}{}^i B(q)$ from changing the quantized value from n to m. This potential problem can potentially be alleviated if approximate estimates are used in place of computation of changes in bit counts, as indicated in equation (10), and in the RDOQ technique described in M. Karczewicz, P. Chen, Y. Ye, and R. Joshi, "R-D based quantization in H.264," in Proc. SPIE 7443, Applications of Digital Image Processing XXXII, September 2009. However, another way to solve the problem may be, that information may not be obtained, for each transform coefficient being quantized, directly from arithmetic coding contexts (e.g., probability estimation elements).

In accordance with aspects of the present disclosure, instead of determining differences in bit counts as part of quantizing transform coefficients, a video encoder such as video encoder 200 may quantize transform coefficients based on quantization offsets that represent estimates of differences in bit count. The video encoder may determine a set of quantization offset parameters for a group of transform coefficients in a block of video data based on side information associated with the block of video data and may quantize the group of transform coefficients based on the set of quantization offset parameters to generate quantized transform coefficients.

Figure 3B:
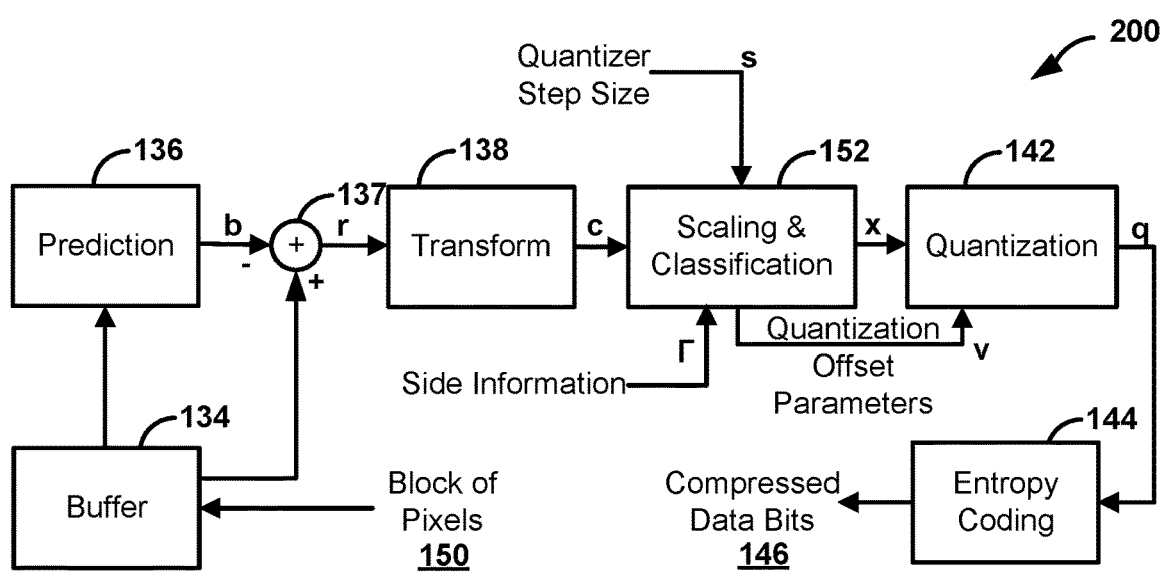
FIG. 3B illustrates a video coding system for low-complexity adaptive quantization based on block classification and one or more sets of quantization offset parameters in accordance with techniques of this disclosure.

FIG. 3B illustrates a technique for low-complexity adaptive quantization based on block classification and one or more sets of quantization offset parameters in accordance with aspects of this disclosure. As shown in FIG. 3B, instead of using information from the entropy coding engine 144, such as indexes of the arithmetic coding contexts used for entropy coding each non-zero transform coefficient and having to access the state of those contexts or information indicative of the bit-cost estimates for quantizing transform coefficients, to estimate the change in the number of bits $\Delta_{m,n}{}^i B(q)$ to encode quantization value q, scaling and classification unit 152 of video encoder 200 may use side information $\Gamma$ (e.g., block size, type of prediction, etc.) associated with a block of video data and the actual distribution of scaled transform coefficients x to determine quantization offset parameters v that quantization unit 142 of video encoder 200 may use to generate quantized transform coefficients.

Video encoder 200 may be able to use quantization offset parameters to generate quantized transform coefficients instead of using the change in the number of bits $\Delta_{m,n}{}^i B(q)$, which measures the change in the number of bits when a single element of q changes from integer value n to integer value m. To formally represent this, element-wise replacement operator $\mathcal{R}_m{}^i$ is defined as in equation (6), and in equations (14) to (16):

video encoder 200 may be able to determine optimal quantization values for transform coefficients based on differences in the number of bits $\Delta_{m,n}{}^i B(q)$, and not directly on the exact number of bits $B(q)$, in order to entropy encode a quantized transform coefficient q. As such, video encoder 200 can identify patterns that are valid for groups of transform coefficients, which may be independent of the exact number of bits to entropy encode a quantized transform coefficient;

changes in the number of bits $\Delta_{m,n}{}^i B(q)$ are normally small. In fact, the largest magnitudes may only be a few bits when m or n are equal or near zero, and the magnitude of those changes decreases very quickly with larger magnitudes of m and n. For example, $\Delta_{n+1,n}{}^i B(q) \approx 0$, if $|m|>16$, $|n|>16$; and since constant $\alpha$ may be relatively large, the ratio $\Delta_{m,n}{}^i(q)/2\alpha$ may be relatively small. This may mean that the optimized decisions in equation (16) correspond to offset parameters u in equation (2) (when parameter p=0), that are close to ½. For example, in the example of Table I below, offset parameter u=0.1 may be optimal only if there is an increase of about 9 bits when the magnitude of a single coefficient's quantization value is incremented by one, which is not what is expected.

TABLE I

Quantization offsets u and increments in the number of encoding bits $\Delta_{n+1,n}{}^i B(q)$ that optimize quantization using equation (2) (parameter p = 0, non-negative values of n, $\alpha$ = 11.14):

| u | 0.50 | 0.45 | 0.40 | 0.35 | 0.30 | 0.25 | 0.20 | 0.15 | 0.10 | 0.05 | 0.00 |
|---|---|---|---|---|---|---|---|---|---|---|---|
| $\Delta_{n+1,n}{}^i B(q)$ | 0.0 | 1.1 | 2.2 | 3.3 | 4.5 | 5.6 | 6.7 | 7.8 | 8.9 | 10.0 | 11.1 |

The example techniques described in this disclosure may utilize the properties described above, and assume that for L-dimensional subgroups (e.g., 4- or 16-dimensional subgroups of 4×4 pixel subblocks of a picture) of elements of vector x, an approximation function $\tilde{r}$ can be found such that $$\tilde{r}(n, g, x, \Gamma) \approx \frac{\Delta_{n+1,n}^i B(q)}{2\alpha}, \quad i = gL, gL+1, \ldots, (g+1)L-1, \quad (17)$$

where x represents a subgroup of scaled transform coefficients, n is a proposed quantization value for a scaled transform coefficient in the group of scaled transform coefficient x, g is an index of the group of scaled transform coefficients to which scaled transform coefficient x belongs, and $\Gamma$ represents a data structure with side information of the block of video data. In some examples, the side information $\Gamma$ can include one or more of: the slice type (I, P, or B) of the block of video data; residual data from intra-frame or inter-frame prediction of the block of video data; block size (e.g., 4×4, 8×8, 16×16, or 32×32) of the block of video data; and luminance or chrominance component.

To simplify the notation, elements of vector x that represent scaled transform coefficients may have been previously rearranged, for example to make memory access more efficient, or to make the approximation more precise, and thus subgroup elements in vector x may have consecutive indexes.

With this notation, and assuming that B(q)=B(−q), if defined that $$u(n, g, x, \Gamma) = \max\left(0, \min\left(1, \frac{1}{2} - \tilde{r}(n, g, x, \Gamma)\right)\right), \quad (18)$$

then the quantization values, if is equality in equation (17), would correspond to equation (16), using $$\hat{q}_i = \text{sign}(x_i) \lfloor |x_i| + u(\lfloor |x_i| \rfloor, g, x, \Gamma) \rfloor, \quad i = gL, gL+1, \cdots, (g+1)L-1. \quad (19)$$

where $\hat{q}_i$ is the quantized value for transform coefficient $x_i$ and $u(n, g, x, \Gamma)$ represents a set of quantization offset parameters for a group g of transform coefficients of the scaled transform coefficient vector x of a block of video data, such as a transform block.

Equation (18) may mostly be used for mathematical consistency, since in practical applications $\tilde{r}(n, g, x, \Gamma) \in [-\frac{1}{2}, \frac{1}{2}]$. If this condition is not satisfied (possibly for case n=0), then a slightly more complicated quantization rule may be used, based on equation (14) instead of equation (15). Equation (19) may be the same type of low computational complexity quantization as in equation (2), with p=0, and a quantization offset u that changes according to the magnitude of the coefficient being quantized.

Another simplification for practical implementation may be based on an expectation of $\Delta_{n+1,n}B(q) \approx 0$ for larger values of $|n|$. Thus, if P-dimensional vector functions $v(g, x, \Gamma)$, which are referred to as quantization offset vectors (QOVs), may be defined such that $$v_n(g, x, \Gamma) = u(n, g, x, \Gamma), \quad n = 0, 1, 2, \cdots, P-1, \quad (20)$$

then equation (19) may be computed approximately using $$\hat{q}_i = \text{sign}(x_i) \lfloor |x_i| + v_{\min(P-1, \lfloor |x_i| \rfloor)}(g, x, \Gamma) \rfloor,$$
$$i = gL, gL+1, \cdots, (g+1)L-1. \quad (21)$$

A quantization offset vector may therefore represent a set of P quantization offset parameters resulting from application of a cutoff at larger quantization values $|n|$ due to the above assumption for the change in the number of bits being close to zero. For $\lfloor |x_i| \rfloor > P-1$, this cutoff is reflected in the application of the min-function for the index of the QOV in equation (21).

Based on these definitions, the following is one example of a technique for adaptive quantization: for each transform coefficient vector,
1. determine the side information $\Gamma$ of a block of video data that the transform coefficient vector x belongs to, such as a transform block;
2. split transform coefficient vector x into K=N/L subgroups, where N is the number of pixels in the block and where L is the number of pixels in each subgroup (e.g., L=16 for a 4×4 subblock); and
3. for each subgroup g, where g=0, 1, $\cdots$, N/L−1:
   a. determine a quantization offset vector $v(g, x, \Gamma)$; and
   b. for each transform coefficient $x_i$ with index i=gL, gL+1, $\cdots$, (g+1)L−1, i.e. each transform coefficient in the subgroup g:
      i. compute quantized value of $x_i$ using a respective element of the quantization offset vector $v(g, x, \Gamma)$, based at least in part on the magnitude of $x_i$, e.g., according to equation (21).

In accordance with aspects of the present disclosure, video encoder 200 may, for a block of video data, such as a transform coefficient block or transform block of the video data, generate sets of quantization offset parameters for quantizing scaled transform coefficients for the block of video data that correspond to changes in the number of bits $\Delta_{m,n}^i B(q)$. Video encoder 200 may, for a block of video data, determine side information associated with the block of video data. The side information may include any combination of one or more of: the slice type (e.g., I, P, or B) of the block of video data, residual data resulting from intra-prediction or inter-prediction of the block of video data, the block size (e.g., 4×4, 8×8, 16×16, or 32×32) of the block of video data, and/or luminance or chrominance components of the block of video data.

Video encoder 200 may divide the scaled transform coefficients of the block of video data into a plurality of groups of scaled transform coefficients, in particular associated with subblocks of the block of video data. If the block of video data includes N pixels, video encoder 200 may divide the block of video data into subblocks of groups of L pixels to result in N/L groups of scaled transform coefficients. For example, video encoder 200 may divide the block of video data into 4×4 subblocks (groups of 16 pixels), 8×8 subblocks (groups of 64 pixels), 16×16 subblocks (groups of 256 pixels), and the like. As such each subblock of the block of video data may be denoted by an index g from 0 to N/L−1, where each subblock includes a group of transform coefficients for the subblock.

Video encoder 200 may, for each subblock, determine a set of quantization offset parameters for the subblock, so that video encoder 200 may quantize the group of scaled transform coefficients in the same subblock with the same set of quantization offset parameters determined for the subblock. As described above, quantization offset parameters may be associated with the change in bit count based on a change of a single element of the quantized transform coefficients for a block of data. In some examples, each quantization offset parameter in a set of quantization offset parameters may range from 0 to 0.5.

The set of quantization offset parameters for a group of scaled transform coefficients in a subblock may be adaptive rather than fixed, so that video encoder 200 may adaptively select different quantization offset parameters for quantizing different scaled transform coefficients in the group of scaled transform coefficients, instead of using the same fixed quantization offset parameter for quantizing scaled transform coefficients in the group of scaled transform coefficients. One example set of adaptive quantization offset parameters for a group of scaled transform coefficients may be [0.2, 0.3, 0.35, 0.4, 0.45, 0.5]. As can be seen, the quantization offsets in the set of adaptive quantization offset parameters are not fixed to a single value, and each element of the set of quantization offset parameters are not necessarily incremented by the same value. For example, while the first element having a value of 0.2 is incremented by 0.1 to result in the second element having a value of 0.3, the second element is incremented by 0.05 to result in the third element having a value of 0.35.

Video encoder 200 may quantize a scaled transform coefficient by, for example, adding the value of the scaled transform coefficient to a quantization offset and rounding down, or taking the floor of, the resulting sum to an integer value. For example, given a scaled transform coefficient x and a quantization offset u, video encoder 200 may determine the quantized value q of the scaled transform coefficient as $q = \lfloor |x| + u \rfloor$.

Video encoder 200 may determine the set of quantization offset parameters for a subblock based on side information of the block of video data. In some examples, video encoder 200 may also determine the set of quantization offset parameters for a subblock based on side information associated with the subblock, such as the maximum magnitude range of the transform coefficients of the subblock, the block size of the subblock, the relative position of the subblock within the block, and the like.

One example of a set of quantization offset parameters is a quantization offset vector (QOV). A QOV may contain a list of quantization offsets, where an M-dimensional QOV may contain M quantization offsets. While aspects of this disclosure are described in terms of QOVs, the techniques described herein are generally applicable to any form of sets of quantization offset parameters, such as arrays, lists, stacks, queues, tables, graphs, and the like.

In some examples, quantization offsets in an M-dimensional QOV are indexed from 0 to M−1. Thus, video encoder 200 may select a quantization offset from a QOV using the equation $v_n = V[\min(M-1, n)]$, where $v_n$ is the quantization offset that is the n-th element of the QOV, if n is less than M−1. Otherwise, $v_n$ is the M−1th element of the QOV. As such, given a scaled transform coefficient x, video encoder 200 may take the absolute value of transform coefficient x and round down to the nearest integer so that the equation may become $v_{\lfloor |x| \rfloor} = V[\min(M-1, \lfloor |x| \rfloor)]$, where $v_{\lfloor |x| \rfloor}$ is the selected quantization offset from the QOV for transform coefficient x. Given a transform coefficient x and a quantization offset u, video encoder 200 may determine a quantized transform coefficient q as $q = \text{sign}(x) \times \lfloor |x| + u \rfloor$. Thus, given $v_{\lfloor |x| \rfloor}$ as the selected quantization offset from the QOV for transform coefficient x, video encoder 200 may determine the quantized transform coefficient x as $q = \text{sign}(x) \times \lfloor "x| + v_{\lfloor |x| \rfloor} \rfloor$.

Figure 4:
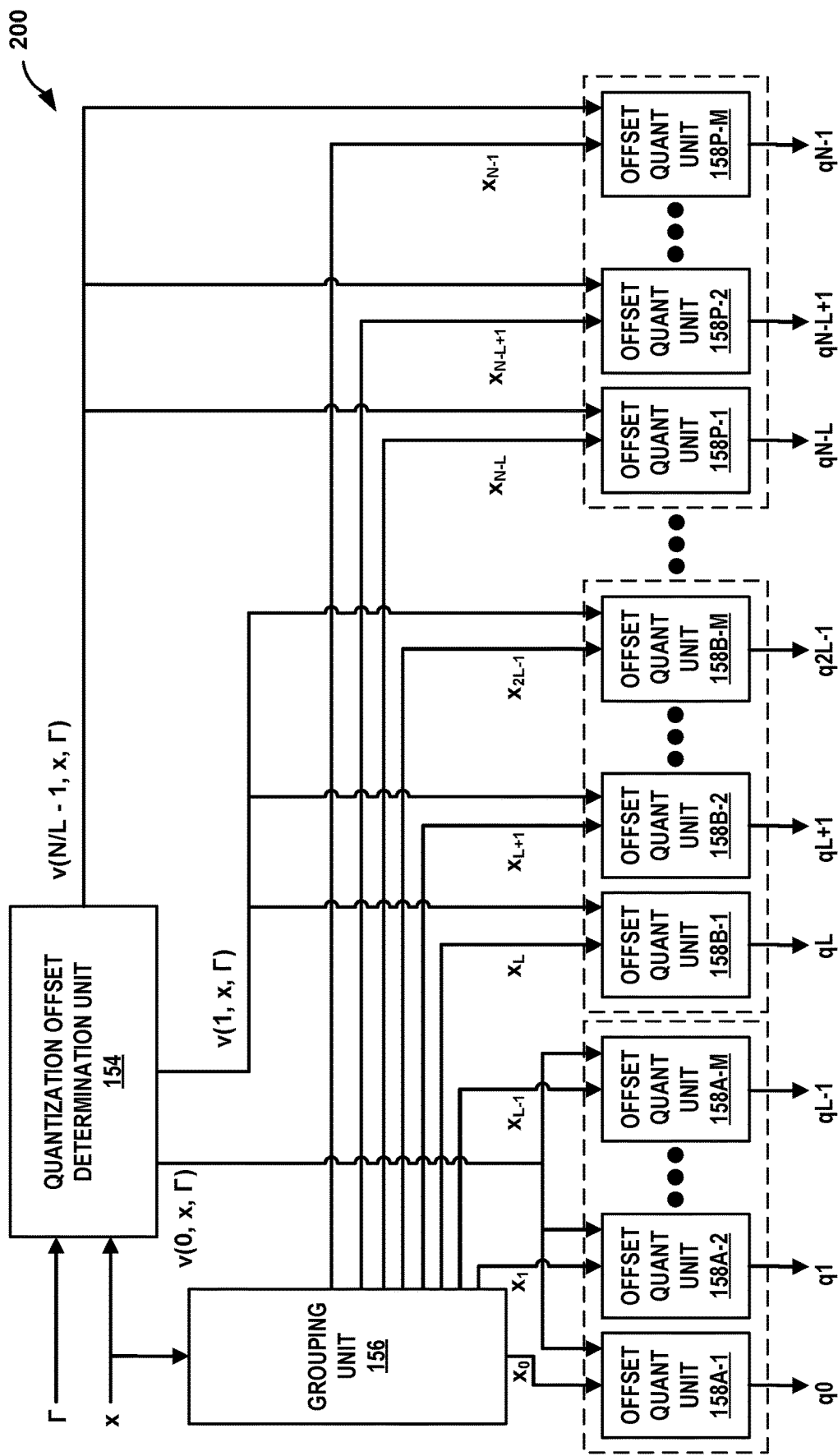
FIG. 4 illustrates parallel implementation of the adaptive quantization using sets of quantization offset parameters in accordance with the techniques of this disclosure.

FIG. 4 illustrates parallel implementation of the adaptive quantization using sets of quantization offset parameters in accordance with techniques of this disclosure. In particular, FIG. 4 illustrates an example implementation of the techniques above for quantizing scaled transform coefficients, where quantization operations on scaled transform coefficients of a block are performed in parallel upon determining the sets of quantization offset parameters for the scaled transform coefficients of a block of video data. The components illustrated in FIG. 4 may be part of, for example, scaling and classification unit 152 and quantization unit 142 of video encoder 200 illustrated in FIG. 3B.

As shown in FIG. 4, video encoder 200 may include quantization offset parameter determination unit 154, grouping unit 156, and offset quantization units 158A-158P. Grouping unit 156 may be processing circuitry configured to receive scaled transform coefficients x of a block of video data (e.g., a transform block) and to divide the scaled transform coefficients into groups of scaled transform coefficients, such as by dividing a block of video data into subblocks. Grouping unit 156 may divide N scaled transform coefficients into groups of L scaled transform coefficients to result in K=N/L groups of scaled transform coefficients that are indexed from 0 to N/L−1. For example, grouping unit 156 may group a set of scaled transform coefficients $x_0$ to $x_{L-1}$, a set of scaled transform coefficients $x_L$ to $x_{2L-1}$, and so on, to a set of scaled transform coefficients $x_{N-L}$ to $x_{N-1}$.

Quantization offset parameter determination unit 154 may be processing circuitry configured to receive scaled transform coefficients x of a block of video data and side information Γ for the block of video data and to determine a set of quantization offset parameters for each of the groups of scaled transform coefficients determined by grouping unit 156. Quantization offset parameter determination unit 154 may determine a set of quantization offset parameters for each group of scaled transform coefficients based on the side information Γ for the block of video data and/or the values of the scaled transform coefficients in the group of scaled transform coefficients.

In the example of FIG. 4, quantization offset parameter determination unit 154 may determine QOVs as the sets of quantization offset parameters for the groups of scaled transform coefficients. The QOVs are presented in FIG. 4 in the form of v(g, x, Γ), where g is the index of the group of scaled transform coefficients from 0 to N/L−1, x is the set of scaled transform coefficients, and Γ is the side information for the block of video data. Thus, quantization offset parameter determination unit 154 may determine QOV v(0, x, Γ) for the group of scaled transform coefficients associated with an index g of 0, QOV v(1, x, Γ) for the group of scaled transform coefficients associated with an index g of 1, up to QOV v(N/L−1, x, Γ) for the group of scaled transform coefficients associated with an index g of N/L−1.

Offset quantization units 158A-158P may be processing circuitry configured to quantize the scaled transform coefficients based on quantization offset parameters. For example, offset quantization units 158A-1-158A-M may quantize the group of scaled transform coefficients $x_0$ to $x_{L-1}$ using QOV v(0, x, Γ) to generate quantized values $q_0$ to $q_{L-1}$. Offset quantization units 158B-1-158B-M may quantize the group of scaled transform coefficients $x_L$ to $x_{2L-1}$ using QOV v(1, x, Γ) to generate quantized values $q_L$ to $q_{2L-1}$. Offset quantization units 158P-1-158P-M may quantize the group of scaled transform coefficients $x_{N-L}$ to $x_{N-1}$ using QOV v(N/L−1, x, Γ) to generate quantized values $q_{N-L}$ to $q_{N-1}$.

Several practical techniques that can be used to determine sets of quantization offset parameters, such as QOVs, are further described below. As can be observed from the derivation above, determining optimal QOVs may be mathematically equivalent to estimating $\Delta_{n+1,n}^i B(q)$.

In some examples, aspects of the techniques described herein may be applicable to HEVC sign-bit hiding. As presented in the description of HEVC sign-bit hiding above, optimized sign-bit hiding may be based on rate-distortion costs. Similar to quantization, quantization offset parameters such as QOVs can also be used to improve the performance of sign-bit hiding.

Using the notation of the description of alternative rate-distortion analysis above, and assuming that $q_i \in \{\lfloor x_i \rfloor, \lfloor x_i \rfloor + 1\}$, the cost of changing the value of that quantized transform coefficient to satisfy the sign-bit hiding parity constraint is given by $$T_i(x, q) = \begin{cases} \Delta_{q_i+1, q_i}^i C(x, q), & q_i = \lfloor x_i \rfloor, \\ \Delta_{q_i-1, q_i}^i C(x, q), & q_i = \lfloor x_i \rfloor + 1, \end{cases} \quad (22)$$

which can be shown to be equal to $$T_i(x, q) = \text{sign}(x_i - q_i) \Delta_{\lfloor x_i \rfloor + 1, \lfloor x_i \rfloor}^i C(x, q) = \quad (23)$$

$$\text{sign}(x_i - q_i) \left[ \lfloor x_i \rfloor + \frac{1}{2} - x_i + \frac{\Delta_{\lfloor x_i \rfloor + 1, \lfloor x_i \rfloor}^i B(q)}{2\alpha} \right]$$

The rule to identify the index of the coefficient to be changed, equivalent to equation (11), becomes $$k = \underset{i \in A}{\text{argmin}} \{T_i(x, q)\}, \quad (24)$$

Using equations (17), (18) and (20), the change in R-D cost can be approximated when a quantization value is changed for sign-bit hiding with the function $$\hat{t}_i(g, x, \Gamma) = \text{sign}(|x_i| - |q_i|)[\lfloor |x_i| \rfloor + 1 - |x_i| - v_{\min(P-1, \lfloor |x_i| \rfloor)}(g, x, \Gamma)]. \quad (25)$$

Figure 5:
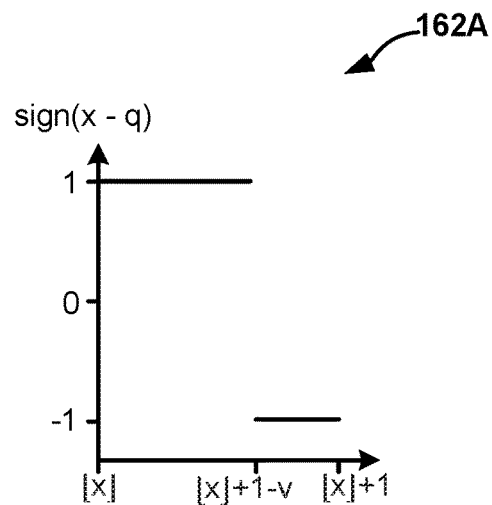
FIG. 5 illustrates factors for sign-bit hiding for approximating rate distortion costs.
Figure 5:
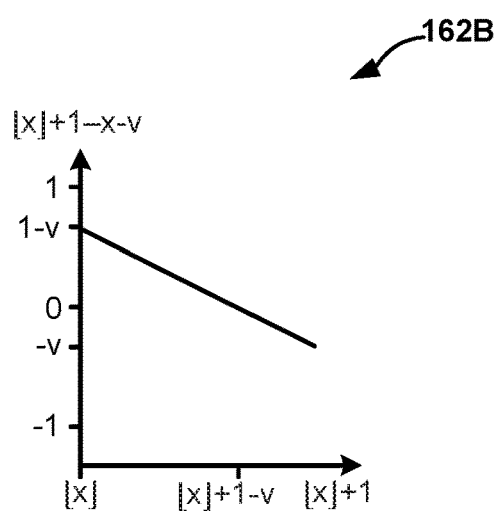
Figure 5:
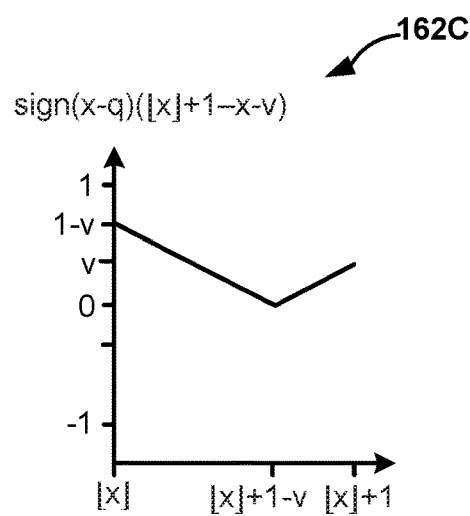

FIG. 5 illustrates the factors in this equation for sign-bit hiding for approximating rate distortion costs. In particular, FIG. 5 illustrates the functions used in the computation of sign-bit hiding R-D costs (assuming positive x). The R-D cost is zero in the value used as threshold in the quantization equation (21), which is consistent with examples where the exact coefficient value of two quantization levels have the same R-D cost.

For example, graph 162A illustrates that sign(x–q), which is the sign of the difference between a scaled transform coefficient x and its quantized value q, is positive from $\lfloor x \rfloor$ to $\lfloor x \rfloor+1-v$, and is negative from $\lfloor x \rfloor+1-v$ to $\lfloor x \rfloor+1$ for quantization offset v. Graph 162B illustrates that $\lfloor x \rfloor+1-x-v$ ranges from $1-v$ at $\lfloor x \rfloor$ to $-v$ at $\lfloor x \rfloor+1$. Graph 162C illustrates that sign(x–q)($\lfloor x \rfloor+1-x-v$) is $1-v$ at $\lfloor x \rfloor$, 0 at $\lfloor x \rfloor+1-v$, and is v at $\lfloor x \rfloor+1$.

Using these approximations, equation (24) can be replaced with $$k = \underset{i \in A}{\operatorname{argmin}}\{\hat{t}_i(g, x, \Gamma)\}, \quad (26)$$

so that the index k of the transform coefficient that is to have its quantized value modified for the purposes of sign-bit hiding can be determined based on side information $\Gamma$ of the block of video data that includes the transform coefficient. As such, video encoder 200 may determine a quantized value for a transform coefficient in a block of video data that video encoder 200 may modify for the purposes of sign-bit hiding based on the side information $\Gamma$ of the block of video data that includes the transform coefficient associated with the quantized value.

Figure 6:
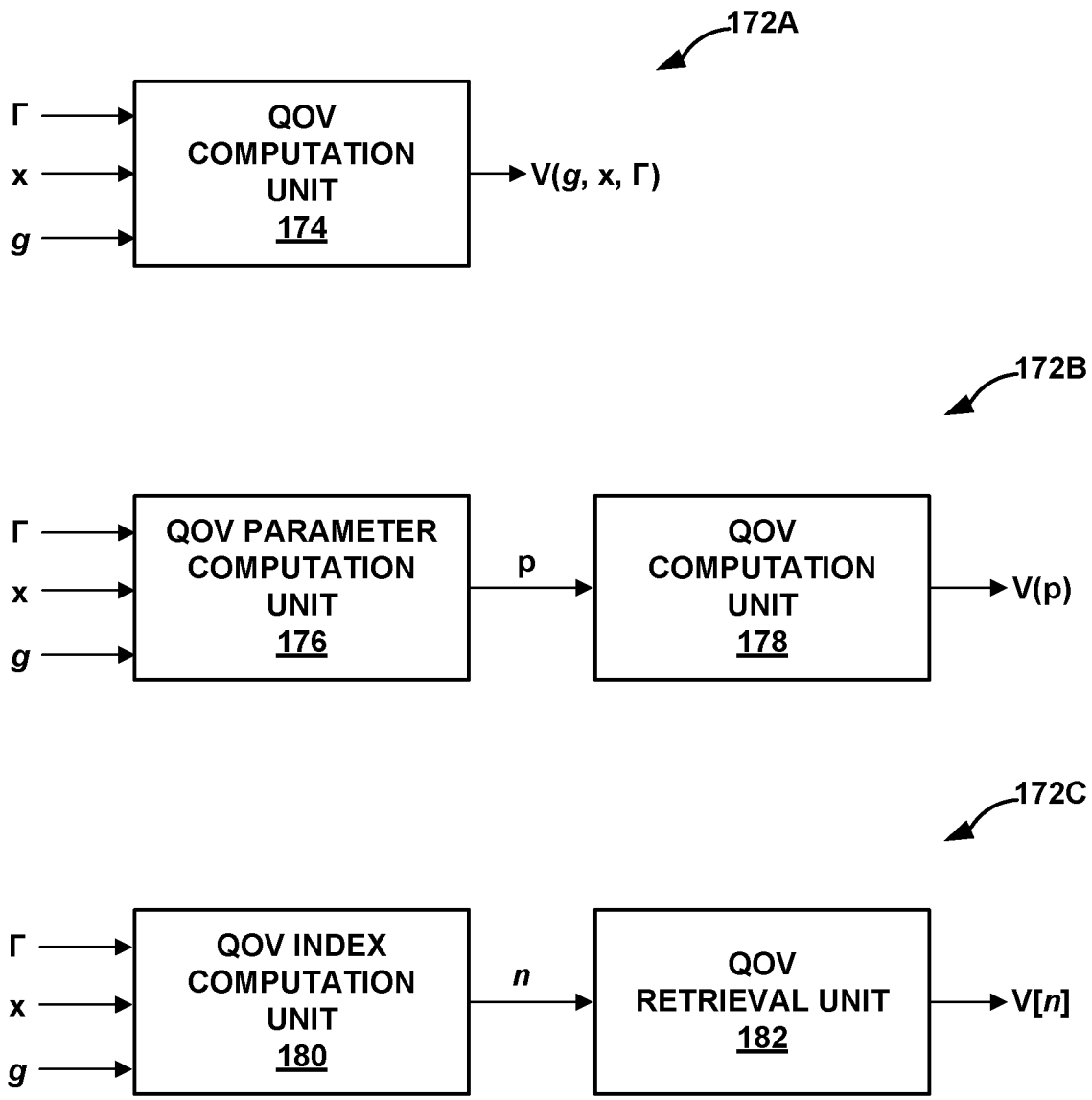
FIG. 6 illustrates techniques for determining quantization offset parameters, in accordance with the techniques of this disclosure.

FIG. 6 illustrates techniques for determining quantization offset parameters, in accordance with the techniques of this disclosure. Given a criterion to map the triplet (g, x, $\Gamma$), where x is a vector of scaled transform coefficients, g is a group index of a group of scaled transform coefficients, and F is side information for the block of video data that includes the group of scaled transform coefficients, to a set of quantization offset parameters, such as a QOV, the values of the elements (i.e., quantization offsets) of a set of quantization offset parameters can be optimized using statistical or machine learning techniques, such that the quantization offset parameters may correspond to quantization offset values that maximize the ratio of the average R-D cost function, obtained with those quantization offset values, and the actual (exact) cost function.

There may be a wide variety of different techniques for determining a set of quantization offset parameters for a group of transform coefficients by mapping parameters g, x, and F associated with a group of scaled transform coefficients (e.g., scaled transform coefficients in a subblock) to a QOV, and the techniques of this disclosure may encompass any suitable technique for mapping parameters g, x, and $\Gamma$ associated with a group of scaled transform coefficients to a QOV.

FIG. 6 illustrates some example techniques for determining a set of quantization offset parameters for a group of transform coefficients according to techniques of this disclosure. While FIG. 6 illustrates a set of quantization offset parameters as a QOV, the techniques illustrated herein are applicable to any other suitable forms of a set of quantization offset parameters.

As shown in FIG. 6, in example 172A, video encoder 200 may implement QOV computation unit 174 which may directly compute a QOV for a set of scaled transform coefficients from parameters group index g, scaled transform coefficients x, and side information $\Gamma$ associated with the block of video data that encompasses the group of scaled transform coefficients.

In example 172B, video encoder 200 may use a parametric approach to determine a QOV, where the elements of a QOV are defined based on a vector p with smaller dimension. Video encoder 200 may implement QOV parameter computation unit 176 that may determine a parameter vector p based at least in part on parameters g, x, and $\Gamma$ associated with a group of transform coefficients, where parameter vector p may be a vector having smaller dimensions (i.e., fewer elements) than the QOV to be determined. Video encoder 200 may implement QOV computation unit 178 that may determine a QOV for a group of transform coefficients having associated parameters g, x, and $\Gamma$ based on parameter vector p.

For example, parameter vector p may be a 2-dimensional parameter vector having smaller dimensions than P-dimensional QOV, and video encoder 200 may determine the P-dimensional QOV for parameters g, x, and $\Gamma$ based on parameter vector p using the following equation, where $v_n$ is the n-th element of the QOV:

$$v_n(p) = \frac{1}{2} - p_0 2^{-p_1 n}, \ n=0,1,2,\cdots,P-1. \quad (27)$$

In some examples, video encoder 200 may utilize a set of precomputed QOVs to determine a QOV for quantizing transform coefficients. The set of precomputed QOVs may be in the form of an array of QOVs, and video encoder 200 may index into the array of QOVs to select a QOV for quantizing a group of transform coefficients. In example 172C, video encoder 200 may implement QOV index computation unit 180 which may map a group of transform coefficients having associated parameters g, x, and $\Gamma$ to an index n, which may be an integer. Video encoder 200 may implement QOV retrieval unit 182 that may index into a precomputed array of QOVs using the index n to determine a QOV out of the array of QOVs for use to quantizing x.

In some examples, video encoder 200 may use general methods that can be used for both classification and regression, such as neural networks, to determine quantization offset parameters in the examples 172A-172C. For example, such neural networks may be trained with training data that includes sets of parameters g, x, and $\Gamma$ and optimal quantization offset parameter values, such as QOVs, with an objective function of the performance of encoding, such as rate-distortion values, resulting quantized values relative to the performance of HEVC HM's RDOQ. In this way, the neural network is trained to associate side information $\Gamma$ of blocks of video data and values of scaled transform coefficients with sets of quantization offset parameter values that optimize the rate-distortion costs of quantizing the scaled transform coefficients with the associated set of quantization offset parameters.

Similarly, in some examples, video encoder 200 may use general regression methods, such as linear regression, logistic regression, Poisson regression, and the like, to determine the relationships between sets of parameters g, x, and $\Gamma$ and optimal quantization offset parameter values using the above-described neural network, such as in the examples 172A and 172B.

In some examples, video encoder 200 may use classification methods, such as classification trees, to classify sets of parameters g, x, and $\Gamma$ to select quantization offset parameters for those parameters from sets of precomputed quantization offset parameters, such as in example 172C.

For example, the above-described neural network may act as a classifier that is trained to classify a group of scaled transform coefficients based on the side information of the block of video data that contains the group of scaled transform coefficients. By classifying a group of scaled transform coefficients, video encoder 200 may select a set of quantization offset parameters for quantizing the group of scaled transform coefficients out of a plurality of sets of quantization offset parameters. One example of such a classification method is described below.

As described in example 172C, video encoder 200 may select, for a group of scaled transform coefficients x in a subblock having associated side information Γ, a set of quantization offset parameters (e.g., a QOV) from sets of precomputed quantization offset parameters (e.g., precomputed QOVs). Video encoder 200 may select a QOV from a set of precomputed QOVs based at least in part on side information for the subblock that contains the group of scaled transform coefficients as well as side information for the block of video data that contains the subblock. For example, video encoder 200 may select a QOV from a set of precomputed QOVs based at least in part on the location of the subblock within a block of video data, the size of the block of video data, and the like.

Figure 7:
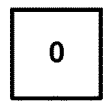
FIG. 7 illustrates examples of codes for identifying locations of a subblock within a block of video data.
Figure 7:
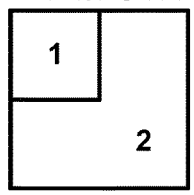
Figure 7:
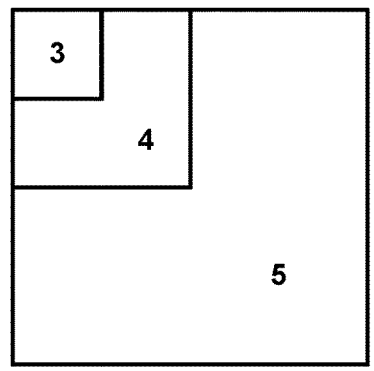
Figure 7:
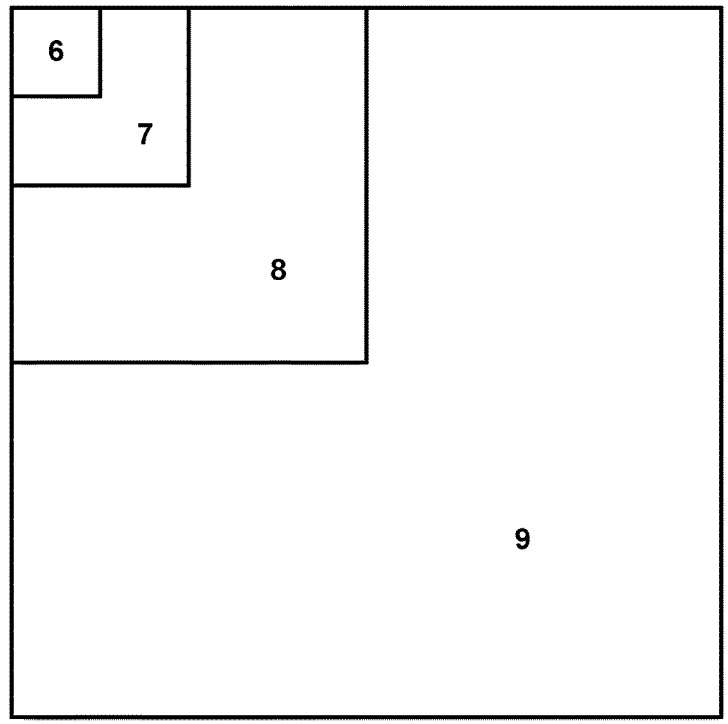

FIG. 7 illustrates examples of codes, numbered from 0 to 9 for identifying locations of a subblock within a block of video data. Such a block of video data may, for example, be an HEVC or VVC transform coefficient block. As shown in FIG. 7, the subblock may be a 4×4 subblock of a 4×4 HEVC transform coefficient block, an 8×8 HEVC transform coefficient block, a 16×16 HEVC transform coefficient block, or a 32×32 HEVC transform coefficient block.

The subblock may have a code that is associated with the location of the subblock within the block and also associated with the size of the block. When the 4×4 subblock is within a 4×4 block, the subblock may have a code of 0. When the 4×4 subblock is within an 8×8 block, the subblock may have a code of 1 when the subblock is a top-left 4×4 subblock and may have a code of 2 when the subblock is not a top-left 4×4 subblock. When the 4×4 subblock is within a 16×16 block, the subblock may have a code of 3 when the subblock is a top-left 4×4 subblock, have a code of 4 when the subblock is not a top-left 4×4 subblock but is within the top-left 8×8 of the block, and have a code of 5 when the subblock is not within the top-left 8×8 of the block. When the 4×4 subblock is within a 32×32 block, the subblock may have a code of 6 when the subblock is a top-left 4×4 subblock, have a code of 7 when the subblock is not a top-left 4×4 subblock but is within the top-left 8×8 of the block, have a code of 8 when the subblock is not within the top-left 8×8 of the block but is within the top-left 16×16 of the block, and have a code of 9 when the subblock is not within the top-left 16×16 of the block.

Aspects of the present disclosure were implemented and tested for creating files compliant to the HEVC standard, using a modified version of the HM reference software (e.g., encoder change only). An example implementation is based on example 172C of FIG. 6, where the index of one QOV is selected for each group of 4×4 transform coefficients in a block.

In this implementation, video encoder 200 may determine a QOV for a group of scaled transform coefficients out of a set of precomputed QOVs using the following function:

$$c(x) = \begin{cases} -1, & \lfloor |x| + 0.5 \rfloor = 0, \\ 0, & \lfloor |x| + 0.5 \rfloor = 1, \\ 1, & \lfloor |x| + 0.5 \rfloor = 2, \\ 2, & 3 \leq \lfloor |x| + 0.5 \rfloor \leq 5, \\ 3, & \lfloor |x| + 0.5 \rfloor \geq 6. \end{cases} \quad (28)$$

Video encoder 200 may determine the index of a QOV for a 4×4 subblock out of a set of precomputed QOVs based on the following parameters:

$P_0 = \max(c(x_i)) \in \{-1, 0, 1, 2, 3\}$ for all transform coefficient values in the 4×4 transform coefficient group;

$P_1 = \min(2, k-1) \in \{0, 1, 2\}$, where k is the number of times $\max(c(x_i)) = P_0$ for transform coefficients in 2×2 subgroups within the 4×4 group;

$P_2 \in \{0, 1, \cdots, 9\}$ is the code used for indicating both the transform coefficient block size and the location of the 4×4 group inside the block, according to the scheme shown in FIG. 7; and $P_3 \in \{0, 1\}$ is 0 if the block is part of an intra slice (according to the HEVC standard), and 1 otherwise.

As can be seen, video encoder 200 may determine a QOV for a group of scaled transform coefficients in a subblock of a block of video data based on side information associated with the subblock. The side information associated with the subblock used to determine the QOV may include, for example, the location of the subblock within the block of video data, such as whether it is a top-left subblock in the block of video data.

The case $P_0 = -1$ may correspond to a group that has all coefficients quantized to zero. Thus, in this case, video encoder 200 may not determine a QOV index for a subblock having $P_0 = -1$. Based on these definitions, video encoder 200 may compute a set of 240 QOV indexes using, for example, the following equation:

$$n = 10 \times (3 \times (2 \times P_0 + P_3) + P_1) + P_2 \in \{0, 1, 2, \cdots, 239\},$$

In the example above, video encoder 200 may determine a QOV for a group of scaled transform coefficients in a subblock of a block of video data based on whether the block of video data is part of an intra slice, the location of the subblock within the block of video data, the size of the block of video data, as well as values of the group of scaled transform coefficients, such as the maximum scaled transform coefficient value in the group of scaled transform coefficients and the number of times the maximum scaled transform coefficient value is in a 2×2 subgroup within the subblock.

In some examples, video encoder 200 may compute a set of 20 QOV indexes that do not depend on the value of the transform coefficients (e.g., vector x) within the subblock, such as by using the following equation: $n = 10 \times P_3 + P_2 \in \{0, 1, 2, \cdots, 19\}$. In this example, video encoder 200 may compute QOV indexes based on the location of the subblock within a transform coefficient block, the size of the transform coefficient block, and whether the transform coefficient block is part of an intra slice. Determining the QOV index that does not depend on the value of the transform coefficients within the subblock may enable video encoder 200 to perform quantization of the group of scaled transform coefficients in the subblock in a single pass, thereby reducing the number of processing cycles used to quantize the group of scaled transform coefficients.

As can be seen in the technique described above, video encoder 200 may determine a set of quantization offset parameters for a group of scaled transform coefficients in a subblock of a block of data based at least in part on the location of the subblock within the block of data as well as the size of the block of data. In some examples, video encoder 200 may also utilize the values of the scaled transform coefficients in the subblock to determine the set of quantization offset parameters for the subblock while in other examples video encoder 200 may be able to determine the set of quantization offset parameters for a subblock without utilizing the values of the scaled transform coefficients in the subblock.

FIG. 8 is a block diagram illustrating an example video encoder 200 that may perform the techniques of this disclosure. FIG. 8 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 8, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 8 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, a combined inter-intra prediction (CIIP) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that define the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as intra-block copy mode coding, affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. In some examples, quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Quantization unit 208 may perform the techniques of this disclosure to quantize transform coefficients, such as the techniques described with respect to FIGS. 3A-7. Specifically, quantization unit 208 may perform the functionalities described with respect to scaling and classification unit 152 and quantization unit 142 of FIG. 3B, quantization offset parameter unit 154, grouping unit 156, and offset quantization units 158A-158P of FIG. 4, and QOV computation unit 174, QOV parameter computation unit 176, QOV computation unit 178, QOV index computation unit 180, and QOV retrieval unit 182 of FIG. 6.

Quantization unit 208 may determine a set of quantization offset parameters for a group of scaled transform coefficients for a block of video data based on side information associated with the block of video data. For example, quantization unit 208 may, for each subblock of a transform coefficient block, such as each 4×4 subblock of the transform coefficient block, determine a set of quantization offset parameters for the group of scaled transform coefficients within the subblock based on side information associated with the transform coefficient block. The quantization offsets in a set of quantization offset parameters for a group of scaled transform coefficients may not be constant. Instead, the quantization offsets in a set of quantization offset parameters may vary depending on the quantization interval.

Quantization unit 208 may perform any of the techniques disclosed in this disclosure to determine a set of quantization offset parameters for a group of scaled transform coefficients in a block of video data based on the side information associated with the block of video data. For example, the side information associated with the block of video data may include any combination of one or more of: the slice type (e.g., I, P, or B) of the block of video data, residual data resulting from intra-prediction or inter-prediction of the block of video data, the block size (e.g., 4×4, 8×8, 16×16, or 32×32) of the block of video data, and/or luminance or chrominance components of the block of video data. The side information associated with the block of video data may also include side information associated with the subblock containing the group of scaled transform coefficients, such as one or more of: the maximum magnitude range of the scaled transform coefficients of the subblock, the block size of the subblock, the relative position of the subblock within the transform coefficient block, and the like.

In some examples, quantization unit 208 may determine, for the group of scaled transform coefficients, a set of quantization offset parameters that may optimize the rate distortion costs of quantizing the group of scaled transform coefficients based on the side information for the block of video data. For example, quantization unit 208 may use machine learning techniques, such as a neural network that may be trained over side information, scaled transform coefficient values, optimal rate distortion costs of quantization, and the like to determine a set of quantization offset parameters for the group of scaled transform coefficients. Quantization unit 208 may use such a neural network to perform regression methods and/or classification methods in order to determine a set of quantization offset parameters for the group of scaled transform coefficients based on the side information associated with the block of video data. As such, quantization unit 208 may be able to determine a set of quantization offset parameters for the group of scaled transform coefficients without use of bit cost estimates determined by entropy encoding unit 220, and without deriving, for each particular non-zero transform coefficient, indexes of arithmetic coding contexts used for entropy coding the particular non-zero transform coefficient.

Quantization unit 208 may quantize each group of scaled transform coefficients for the block of video data to generate quantized transform coefficients for each subblock of the block of video data based at least in part on the set of quantization offset parameters. As described above, because quantization unit 208 may determine a set of quantization offset parameters for each group of scaled transform coefficients in the block of video data, quantization unit 208 may quantize each group of scaled transform coefficients using the set of quantization offset parameters associated with the corresponding group of scaled transform coefficients. Thus, in some examples, quantization unit 208 may be able to quantize the scaled transform coefficients within the same group of scaled transform coefficients in parallel. Further, in some examples, quantization unit 208 may be able to quantize multiple groups of scaled transform coefficients for the block of video data in parallel.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208, in order to generate an encoded video bitstream based at least in part on the quantized transform coefficients for the block of video data.

As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine a set of quantization offset parameters for a group of scaled transform coefficients for a block of video data based on side information associated with the block of video data, quantize the group of scaled transform coefficients for the block of video data to generate quantized transform coefficients for the block of video data based at least in part on the set of quantization offset parameters, and generate an encoded video bitstream based at least in part on the quantized transform coefficients for the block of video data.

FIG. 9 is a block diagram illustrating an example video decoder 300 that may perform the techniques of this disclosure. FIG. 9 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 9, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, a combined inter-intra prediction (CIIP) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 9 are illustrated to assist with understanding the operations performed by video decoder 300. The units may be implemented as fixed-function circuits, programmable circuits, or a combination thereof. Similar to FIG. 8, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 8).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 8). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to perform the techniques of this disclosure.

Figure 10:
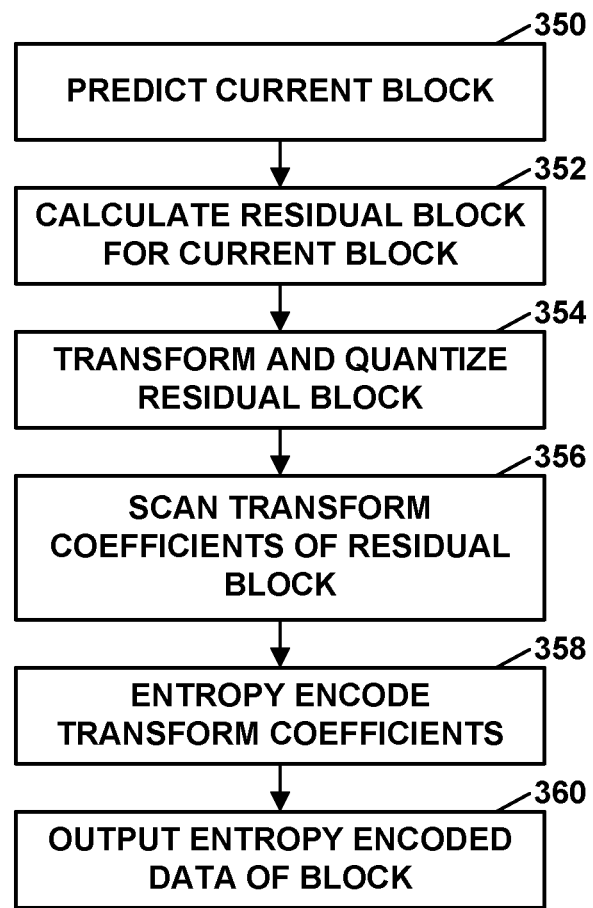
FIG. 10 is a flowchart illustrating an example method for encoding a current block.

FIG. 10 is a flowchart illustrating an example method for encoding a current block. The current block may comprise a current CU. Although described with respect to video encoder 200 (FIGS. 1 and 8), it should be understood that other devices may be configured to perform a method similar to that of FIG. 10.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). In particular, video encoder 200 may perform the techniques of this disclosure, including determining a set of quantization offset parameters for a group of scaled transform coefficients for a block of video data based on side information associated with the block of video data, quantizing the group of scaled transform coefficients for the block of video data to generate quantized transform coefficients for the block of video data based at least in part on the set of quantization offset parameters, and generating an encoded video bitstream based at least in part on the quantized transform coefficients for the block of video data.

During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 11:
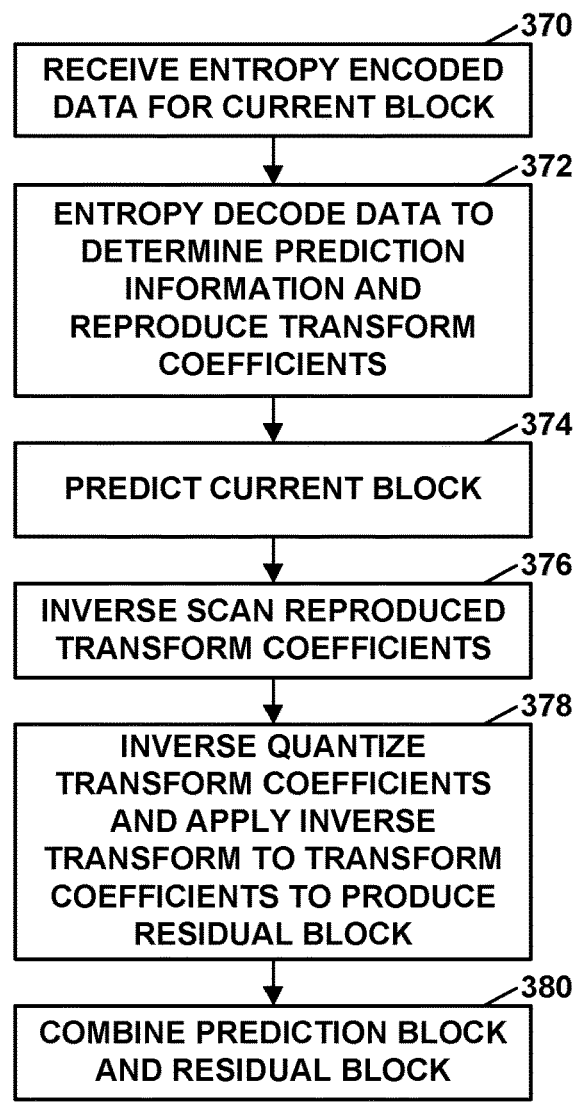
FIG. 11 is a flowchart illustrating an example method for decoding a current block of video data.

FIG. 11 is a flowchart illustrating an example method for decoding a current block of video data. The current block may comprise a current CU. Although described with respect to video decoder 300 (FIGS. 1 and 9), it should be understood that other devices may be configured to perform a method similar to that of FIG. 11.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 12:
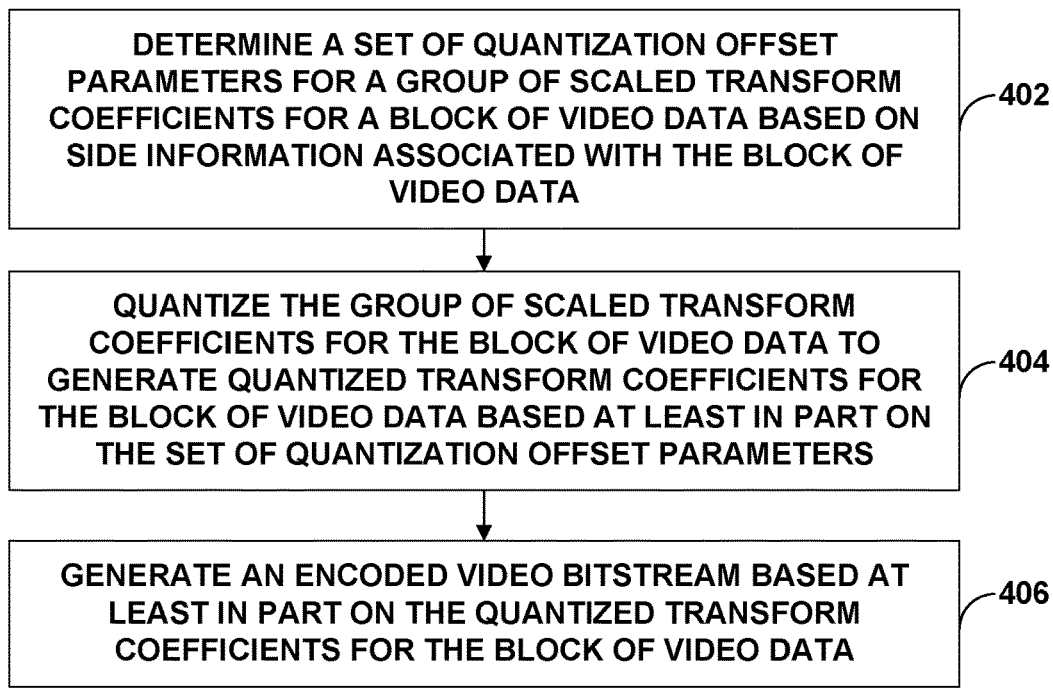
FIG. 12 is a flowchart illustrating a method of encoding video data according to the techniques of this disclosure.

FIG. 12 is a flowchart illustrating a method of encoding video data according to the techniques of this disclosure. Although described with respect to video encoder 200 (FIGS. 1 and 8), it should be understood that other devices may be configured to perform a method similar to that of FIG. 12.

As shown in FIG. 12, video encoder 200 (e.g., quantization unit 208) may determine a set of quantization offset parameters for a group of scaled transform coefficients for a block of video data based on side information associated with the block of video data (402). In some examples, to determine the set of quantization offset parameters for the group of scaled transform coefficients for the block of video data, video encoder 200 may classify the group of scaled transform coefficients based at least in part on the side information associated with the block of video data and select the set of quantization offset parameters for the group of scaled transform coefficients from a plurality of sets of quantization offset parameters based on the classification of the group of scaled transform coefficients.

In some examples, to classify the group of scaled transform coefficients, video encoder 200 may determine an index for the group of scaled transform coefficients based at least in part on the side information associated with the block of video data, where to select the set of quantization offset parameters for the group of scaled transform coefficients from a plurality of sets of quantization offset parameters based on the classification of the group of scaled transform coefficients, video encoder 200 may index, using the determined index, into the plurality of sets of quantization offset parameters to select the set of quantization offset parameters for the group of scaled transform coefficients.

In some examples, the group of scaled transform coefficients comprises scaled transform coefficients for a subblock of the block of video data, and the side information associated with the block of video data comprises a location of the subblock within the block of video data and a block size of the block of video data. In some examples, classifying the group of scaled transform coefficients based at least in part on the side information associated with the block of video data is not based on values of the scaled transform coefficients for the subblock of the block of data.

In some examples, to determine the set of quantization offset parameters for the group of scaled transform coefficients for the block of video data, video encoder 200 may determine a set of parameters having a smaller dimension than the set of quantization offset parameters based on side information associated with the block of video data, and may determine the set of quantization offset parameters for the group of scaled transform coefficients based on the set of parameters.

In some examples, to determine the set of quantization offset parameters for the group of scaled transform coefficients for the block of video data, video encoder 200 may determine, using a neural network, the set of quantization offset parameters for the group of scaled transform coefficients for the block of video data. In some examples, to determine the set of quantization offset parameters for the group of scaled transform coefficients for the block of video data, video encoder 200 may determine, using at least one of: a classification technique or a regression technique, the set of quantization offset parameters for the group of scaled transform coefficients for the block of video data.

Video encoder 200 (e.g., quantization unit 208) may quantize the group of scaled transform coefficients for the block of video data to generate quantized transform coefficients for the block of video data based at least in part on the set of quantization offset parameters (404).

Video encoder 200 (e.g., entropy encoding unit 220) may generate an encoded video bitstream based at least in part on the quantized transform coefficients for the block of video data (406).

In some examples, video encoder 200 may divide a plurality of scaled transform coefficients into a plurality of groups of scaled transform coefficients associated with subblocks of the block of video data, where the plurality of groups of scaled transform coefficients include the group of scaled transform coefficients for the subblock of the block of video data. In some examples, to determine the set of quantization offset parameters for the group of scaled transform coefficients for the block of video data, video encoder 200 may determine, for each of the plurality of groups of scaled transform coefficients, a corresponding set of quantization offset parameters, where quantizing the group of scaled transform coefficients for the subblock of the block of video data includes quantizing each of the plurality of groups of scaled transform coefficients based on the corresponding set of quantization offset parameters.

In some examples, to quantize the scaled transform coefficients for the subblock of the block of video data, video encoder 200 may determine, for each scaled transform coefficient, a corresponding quantization offset parameter from the set of quantization offset parameters, and may quantize each scaled transform coefficient based at least in part on the corresponding quantization offset parameter.

In some examples, the plurality of sets of quantization offset parameters comprises quantization offset vectors.

Illustrative examples of a first aspect of the disclosure include:

Aspect 1: A method of coding video data, the method comprising any combination of the techniques described in this disclosure.

Aspect 2: A method of coding video data, the method comprising: determining a plurality of quantization offset vectors for a plurality of transform coefficients for a current block of the video data based at least in part on scaled transform coefficients for the current block and side information associated with the current block; and quantizing the transform coefficients for the current block to generate quantized transform coefficients for the current block based at least in part on the plurality of quantization offset vectors.

Aspect 3: The method according to Aspect 2, further comprising: splitting the transform coefficients into a plurality of subgroups of transform coefficients, wherein determining the plurality of quantization offset vectors for the plurality of transform coefficients for the current block comprises determining a quantization offset vector for each subgroup of the plurality of subgroups of transform coefficients.

Aspect 4: The method according to any combination of Aspects 2 and 3, wherein determining the plurality of quantization vectors further comprises: determining a plurality of index values; indexing, using the plurality of index values, into a table of quantization offset vectors to determine the plurality of quantization offset vectors.

Aspect 5: The method according to Aspect 4, wherein determining the plurality of index values is based at least in part on values of the plurality of transform coefficients in a transform coefficient group.

Aspect 6: The method according to any combination of Aspects 4 and 5, wherein determining the plurality of index values is based at least in part on a size of a transform coefficient block and a location of a transform coefficient group within the transform coefficient block.

Aspect 7: The method according to any combination of Aspects 4-6, wherein determining the plurality of index values is based at least in part on whether the current block is part of an intra slice.

Aspect 8: The method according to any combination of Aspects 2-7, wherein determining the plurality of quantization offset vectors further comprises: determining one or more of the plurality of quantization offset vectors without the scaled transform coefficients for the current block; and determining other quantization offset vectors based on the scaled transform coefficients for the current block.

Aspect 9: The method according to any combination of Aspects 2-8, wherein determining the plurality of quantization offset vectors for the plurality of transform coefficients for the current block of video data comprises: defining a quantization offset vector using a smaller-dimension parameter vector.

Aspect 10: The method according to any combination of Aspects 2-9, wherein the side information comprises one or more of: a slice type, a block size, a type of prediction, or an indication of whether the current block to be quantized comprises a luminance component or a chrominance component.

Aspect 11: The method according to any combination of Aspects 2-10, wherein quantizing the transform coefficients for the current block of video data comprises: quantizing a first transform coefficient of the transform coefficients for the current block in parallel with a second transform coefficient of the transform coefficients for the current block.

Aspect 12: The method according to any combination of Aspects 2-11, wherein determining the plurality of quantization offset vectors for the plurality of transform coefficients for the current block comprises: determining an estimated change in a number of bits to entropy code the quantized transform coefficients for the current block of data based on a change of a single element of the quantized transform coefficients for the current block.

Aspect 13: The method according to Aspect 12, wherein determining the estimated change in the number of bits to entropy code the quantized transform coefficients for the current block based on the change of the single element of the quantized transform coefficients for the current block comprises: using a same estimation rule that is computed once to determine the plurality of quantization offset vectors for the plurality of quantization offset vectors for the plurality of transform coefficients for the current block.

Aspect 14: The method according to any combination of Aspects 2-13, wherein determining the plurality of quantization offset vectors for the plurality of transform coefficients for the current block comprises: determining the plurality of quantization offset vectors for the plurality of transform coefficients for the current block without deriving, for each particular non-zero transform coefficient, indexes of arithmetic coding contexts used for entropy coding the particular non-zero transform coefficient.

Aspect 15: The method according to any combination of Aspects 2-14, wherein determining the plurality of quantization offset vectors for the plurality of transform coefficients for the current block comprises: optimizing values of the plurality of quantization offset vectors using at least one of: statistical techniques or machine learning techniques.

Aspect 16: The method according to Aspect 15, wherein the at least one of: statistical techniques or machine learning techniques comprises at least one of: classification techniques or regression techniques.

Aspect 17: The method according to Aspect 16, wherein the regression techniques comprise general regression techniques.

Aspect 18: The method according to any combination of Aspects 16 and 17, wherein the classification techniques comprise classification trees.

Aspect 19: The method according to any combination of Aspects 2-18, wherein coding comprises decoding.

Aspect 20: The method according to any combination of Aspects 2-18, wherein coding comprises encoding.

Aspect 21: A device for coding video data, the device comprising one or more means for performing the method according to any combination of Aspects 1-20.

Aspect 22: The device according to Aspect 21, wherein the one or more means comprise one or more processors implemented in circuitry.

Aspect 23: The device according to any combination of Aspects 21 and 22, further comprising a memory to store the video data.

Aspect 24: The device according to any combination of 21-23, further comprising a display configured to display decoded video data.

Aspect 25: The device according to any combination of Aspects 21-24, wherein the device comprises one or more of a camera, a computer, a mobile device, a broadcast receiver device, or a set-top box.

Aspect 26: The device according to any combination of Aspects 21-25, wherein the device comprises a video decoder.

Aspect 27: The device according to any combination of Aspects 21-26, wherein the device comprises a video encoder.

Aspect 28: A computer-readable storage medium having stored thereon instructions that, when executed, cause one or more processors to perform the method according to any combination of Aspects 1-20.

Illustrative examples of a second aspect of the disclosure include:

Aspect 1: A method of encoding video data, the method comprising: determining a set of quantization offset parameters for a group of scaled transform coefficients for a block of video data based on side information associated with the block of video data; quantizing the group of scaled transform coefficients for the block of video data to generate quantized transform coefficients for the block of video data based at least in part on the set of quantization offset parameters; and generating an encoded video bitstream based at least in part on the quantized transform coefficients for the block of video data.

Aspect 2: The method of Aspect 1, wherein determining the set of quantization offset parameters for the group of scaled transform coefficients for the block of video data comprises: selecting the set of quantization offset parameters for the group of scaled transform coefficients from a plurality of sets of quantization offset parameters based on the side information associated with the block of video data.

Aspect 3: The method of Aspect 2, wherein selecting the set of quantization offset parameters for the group of scaled transform coefficients from the plurality of sets of quantization offset parameters comprises: determining an index associated with the group of scaled transform coefficients based at least in part on the side information associated with the block of video data; and indexing, using the index associated with the group of scaled transform coefficients, into the plurality of sets of quantization offset parameters to select the set of quantization offset parameters for the group of scaled transform coefficients.

Aspect 4: The method of Aspect 2 or 3, wherein: the group of scaled transform coefficients comprises scaled transform coefficients for a subblock of the block of video data; and the side information associated with the block of video data comprises a location of the subblock within the block of video data and a block size of the block of video data.

Aspect 5: The method of Aspect 4, wherein selecting the set of quantization offset parameters for the group of scaled transform coefficients from the plurality of sets of quantization offset parameters comprises: selecting the set of quantization offset parameters for the group of scaled transform coefficients from the plurality of sets of quantization offset parameters without using scaled transform coefficient values of the group of scaled transform coefficients for the subblock of the block of video data.

Aspect 6: The method of Aspect 1, wherein determining the set of quantization offset parameters for the group of scaled transform coefficients for the block of video data comprises: determining, based on the side information associated with the block of video data, a set of parameters for parametrization of the set of quantization offset parameters, the set of parameters having a smaller size than the set of quantization offset parameters; and determining the set of quantization offset parameters for the group of scaled transform coefficients based on the set of parameters having the smaller size.

Aspect 7: The method of any one of Aspects 1 to 5, wherein determining the set of quantization offset parameters for the group of scaled transform coefficients for the block of video data further comprises: determining, using a neural network and based on the side information associated with the block of video data, the set of quantization offset parameters for the group of scaled transform coefficients for the block of video data.

Aspect 8: The method of Aspect 7, wherein determining the set of quantization offset parameters for the group of scaled transform coefficients for the block of video data further comprises: determining, using at least one of: a classification technique or a regression technique, the set of quantization offset parameters for the group of scaled transform coefficients for the block of video data.

Aspect 9: The method of any one of Aspects 1 to 8, further comprising: dividing a plurality of scaled transform coefficients of the block of video data into a plurality of groups of scaled transform coefficients associated with subblocks of the block of video data, wherein the plurality of groups of scaled transform coefficients includes the group of scaled transform coefficients for the block of video data; wherein determining the set of quantization offset parameters for the group of scaled transform coefficients for the block of video data comprises determining, for each of the plurality of groups of scaled transform coefficients, a corresponding set of quantization offset parameters; and wherein quantizing the group of scaled transform coefficients for the block of video data includes quantizing each of the plurality of groups of scaled transform coefficients based on the corresponding set of quantization offset parameters.

Aspect 10: The method of any one of Aspects 1 to 9, wherein quantizing the group of scaled transform coefficients for the block of video data further comprises: determining, for each scaled transform coefficient of the group of scaled transform coefficients, a corresponding quantization offset parameter from the set of quantization offset parameters; and quantizing each scaled transform coefficient of the group of scaled transform coefficients based at least in part on the corresponding quantization offset parameter.

Aspect 11: The method of any one of Aspects 1 to 10, wherein the side information includes one or more of: a slice type of the block of video data, block size of the block of video data, or an indication of whether the block of video data comprises a luminance component or a chrominance component.

Aspect 12: The method of any one of Aspects 1 to 11, wherein determining the set of quantization offset parameters for the group of scaled transform coefficients for the block of video data comprises: determining the set of quantization offset parameters for the group of scaled transform coefficients for the block of video data without using one or more bit cost estimates determined via entropy coding.

Aspect 13: The method of any one of Aspects 1 to 12, wherein the set of quantization offset parameters comprises quantization offset vectors.

Aspect 14: A device for encoding video data, the device comprising: a memory; processing circuitry in communication with the memory, the processing circuitry being configured to: determine a set of quantization offset parameters for a group of scaled transform coefficients for a block of video data based on side information associated with the block of video data; quantize the group of scaled transform coefficients for the block of video data to generate quantized transform coefficients for the block of video data based at least in part on the set of quantization offset parameters; and generate an encoded video bitstream based at least in part on the quantized transform coefficients for the block of video data.

Aspect 15: The device of Aspect 14, wherein to determine the set of quantization offset parameters for the group of scaled transform coefficients for the block of video data, the processing circuitry is further configured to: select the set of quantization offset parameters for the group of scaled transform coefficients from a plurality of sets of quantization offset parameters based on the side information associated with the block of video data.

Aspect 16: The device of Aspect 15, wherein to select the set of quantization offset parameters for the group of scaled transform coefficients from the plurality of sets of quantization offset parameters, the processing circuitry is further configured to: determine an index associated with the group of scaled transform coefficients based at least in part on the side information associated with the block of video data; and index, using the index associated with the group of scaled transform coefficients, into the plurality of sets of quantization offset parameters to select the set of quantization offset parameters for the group of scaled transform coefficients.

Aspect 17: The device of Aspect 15 or 16, wherein: the group of scaled transform coefficients comprises scaled transform coefficients for a subblock of the block of video data; and the side information associated with the block of video data comprises a location of the subblock within the block of video data and a block size of the block of video data.

Aspect 18: The device of Aspect 17, wherein to select the set of quantization offset parameters for the group of scaled transform coefficients from the plurality of sets of quantization offset parameters, the processing circuitry is further configured to: select the set of quantization offset parameters for the group of scaled transform coefficients from the plurality of sets of quantization offset parameters without using scaled transform coefficient values of the group of scaled transform coefficients for the subblock of the block of video data.

Aspect 19: The device of Aspect 14, wherein to determine the set of quantization offset parameters for the group of scaled transform coefficients for the block of video data, the processing circuitry is further configured to: determine, based on the side information associated with the block of video data, a set of parameters for parametrization of the set of quantization offset parameters, the set of parameters having a smaller size than the set of quantization offset parameters; and determine the set of quantization offset parameters for the group of scaled transform coefficients based on the set of parameters having the smaller size.

Aspect 20: The device of any one of Aspects 14 to 18, wherein to determine the set of quantization offset parameters for the group of scaled transform coefficients for the block of video data, the processing circuitry is further configured to: determine, using a neural network and based on the side information associated with the block of video data, the set of quantization offset parameters for the group of scaled transform coefficients for the block of video data.

Aspect 21: The device of Aspect 20, wherein to determine the set of quantization offset parameters for the group of scaled transform coefficients for the block of video data, the processing circuitry is further configured to: determine, using at least one of: a classification technique or a regression technique, the set of quantization offset parameters for the group of scaled transform coefficients for the block of video data.

Aspect 22: The device of any one of Aspects 14 to 21, wherein the processing circuitry is further configured to: divide a plurality of scaled transform coefficients of the block of video data into a plurality of groups of scaled transform coefficients associated with subblocks of the block of video data, wherein the plurality of groups of scaled transform coefficients include the group of scaled transform coefficients for the block of video data; wherein to determine the set of quantization offset parameters for the group of scaled transform coefficients for the block of video data, the processing circuitry is further configured to determine, for each of the plurality of groups of scaled transform coefficients, a corresponding set of quantization offset parameters; and wherein quantizing the group of scaled transform coefficients for the block of video data includes quantizing each of the plurality of groups of scaled transform coefficients based on the corresponding set of quantization offset parameters.

Aspect 23: The device of any one of Aspects 14 to 22, wherein to quantize the group of scaled transform coefficients for the block of video data, the processing circuitry is further configured to: determine, for each scaled transform coefficient of the group of scaled transform coefficients, a corresponding quantization offset parameter from the set of quantization offset parameters; and quantize each scaled transform coefficient of the group of scaled transform coefficients based at least in part on the corresponding quantization offset parameter.

Aspect 24: The device of any one of Aspects 14 to 23, wherein the side information includes one or more of: a slice type of the block of video data, block size of the block of video data, or an indication whether the block of video data comprises a luminance component or a chrominance component.

Aspect 25: The device of any one of Aspects 14 to 24, wherein to determine the set of quantization offset parameters for the group of scaled transform coefficients for the block of video data, the processing circuitry is further configured to: determine the set of quantization offset parameters for the group of scaled transform coefficients for the block of video data without using one or more bit cost estimates determined via entropy coding.

Aspect 26: The device of any one of Aspects 14 to 25 wherein the plurality of sets of quantization offset parameters comprises quantization offset vectors.

Aspect 27: The device of any one of Aspects 14 to 26, wherein the device comprises one or more of a camera, a computer, or a mobile device.

Aspect 28: An apparatus for encoding video data, the apparatus comprising: means for determining a set of quantization offset parameters for a group of scaled transform coefficients for a block of video data based on side information associated with the block of video data; means for quantizing the group of scaled transform coefficients for the block of video data to generate quantized transform coefficients for the block of video data based at least in part on the set of quantization offset parameters; and means for generating an encoded video bitstream based at least in part on the quantized transform coefficients for the block of video data.

Aspect 29: The apparatus of Aspect 28, wherein the means for determining the set of quantization offset parameters for the group of scaled transform coefficients for the block of video data further comprises: means for selecting the set of quantization offset parameters for the group of scaled transform coefficients from a plurality of sets of quantization offset parameters based on the side information associated with the block of video data.

Aspect 30: The apparatus of Aspect 29, wherein the means for selecting the set of quantization offset parameters for the group of scaled transform coefficients from the plurality of sets of quantization offset parameters further comprises: means for determining an index associated with the group of scaled transform coefficients based at least in part on the side information associated with the block of video data; and means for indexing, using the index associated with the group of scaled transform coefficients, into the plurality of sets of quantization offset parameters to select the set of quantization offset parameters for the group of scaled transform coefficients.

Aspect 31: The apparatus of Aspect 29 or 30, wherein: the group of scaled transform coefficients comprises scaled transform coefficients for a subblock of the block of video data; and the side information associated with the block of video data comprises a location of the subblock within the block of video data and a block size of the block of video data.

Aspect 32: The apparatus of Aspect 31, wherein the means for selecting the set of quantization offset parameters for the group of scaled transform coefficients from the plurality of sets of quantization offset parameters further comprises: means for selecting the set of quantization offset parameters for the group of scaled transform coefficients from the plurality of sets of quantization offset parameters without using scaled transform coefficient values of the group of scaled transform coefficients for the subblock of the block of video data.

Aspect 33: The apparatus of Aspect 28, wherein the means for determining the set of quantization offset parameters for the group of scaled transform coefficients for the block of video data further comprises: means for determining, based on the side information associated with the block of video data, a set of parameters for parametrization of the set of quantization offset parameters, the set of parameters having a smaller size than the set of quantization offset parameters; and means for determining the set of quantization offset parameters for the group of scaled transform coefficients based on the set of parameters having the smaller size.

Aspect 34: The apparatus of any one of Aspects 28 to 32, wherein the means for determining the set of quantization offset parameters for the group of scaled transform coefficients for the block of video data further comprises: means for determining, using a neural network and based on the side information associated with the block of video data, the set of quantization offset parameters for the group of scaled transform coefficients for the block of video data.

Aspect 35: The apparatus of Aspect 34, wherein the means for determining the set of quantization offset parameters for the group of scaled transform coefficients for the block of video data comprises: means for determining, using at least one of: a classification technique or a regression technique, the set of quantization offset parameters for the group of scaled transform coefficients for the block of video data.

Aspect 36: The apparatus of any one of Aspects 28 to 35, further comprising: means for dividing a plurality of scaled transform coefficients of the block of video data into a plurality of groups of scaled transform coefficients associated with subblocks of the block of video data, wherein the plurality of groups of scaled transform coefficients include the group of scaled transform coefficients for the block of video data; wherein the means for determining the set of quantization offset parameters for the group of scaled transform coefficients for the block of video data comprises means for determining, for each of the plurality of groups of scaled transform coefficients, a corresponding set of quantization offset parameters; and wherein the means for quantizing the group of scaled transform coefficients for the block of video data further includes means for quantizing each of the plurality of groups of scaled transform coefficients based on the corresponding set of quantization offset parameters.

Aspect 37: The apparatus of any one of Aspects 28 to 36, wherein the means for quantizing the group of scaled transform coefficients for the block of video data further comprises: means for determining, for each scaled transform coefficient of the group of scaled transform coefficients, a corresponding quantization offset parameter from the set of quantization offset parameters; and means for quantizing each scaled transform coefficient of the group of scaled transform coefficients based at least in part on the corresponding quantization offset parameter.

Aspect 38: The apparatus of any one of Aspects 28 to 37, wherein the side information includes one or more of: a slice type of the block of video data, block size of the block of video data, or an indication of whether the block of video data comprises a luminance component or a chrominance component.

Aspect 39: The apparatus of any one of Aspects 28 to 38, wherein the means for determining the set of quantization offset parameters for the group of scaled transform coefficients for the block of video data comprises: means for determining the set of quantization offset parameters for the group of scaled transform coefficients for the block of video data without using one or more bit cost estimates determined via entropy coding.

Aspect 40: The apparatus of any one of Aspects 28 to 39, wherein the set of quantization offset parameters comprises quantization offset vectors.

Aspect 41: A computer-readable storage medium having stored thereon instructions that, when executed, cause one or more processors to: determine a set of quantization offset parameters for a group of scaled transform coefficients for a block of video data based on side information associated with the block of video data; quantize the group of scaled transform coefficients for the block of video data to generate quantized transform coefficients for the block of video data based at least in part on the set of quantization offset parameters; and generate an encoded video bitstream based at least in part on the quantized transform coefficients for the block of video data.

Aspect 42: The computer-readable storage medium of Aspect 41, wherein the instructions that cause the one or more processors to determine the set of quantization offset parameters for the group of scaled transform coefficients for the block of video data comprise instructions that cause the one or more processors to: select the set of quantization offset parameters for the group of scaled transform coefficients from a plurality of sets of quantization offset parameters based on the side information associated with the block of video data.

Aspect 43: The computer-readable storage medium of Aspect 42, wherein the instructions that cause the one or more processors to select the set of quantization offset parameters for the group of scaled transform coefficients from the plurality of sets of quantization offset parameters comprise instructions that cause the one or more processors to: determine an index for the group of scaled transform coefficients based at least in part on the side information associated with the block of video data; and index, using the index, into the plurality of sets of quantization offset parameters to select the set of quantization offset parameters for the group of scaled transform coefficients.

Aspect 44: The computer-readable storage medium of Aspect 42 or 43, wherein: the group of scaled transform coefficients comprises scaled transform coefficients for a subblock of the block of video data; and the side information associated with the block of video data comprises a location of the subblock within the block of video data and a block size of the block of video data.

Aspect 45: The computer-readable storage medium of Aspect 44, wherein the instructions that cause the one or more processors to select the set of quantization offset parameters for the group of scaled transform coefficients from the plurality of sets of quantization offset parameters comprise instructions that cause the one or more processors to: select the set of quantization offset parameters for the group of scaled transform coefficients from the plurality of sets of quantization offset parameters without using scaled transform coefficient values of the group of scaled transform coefficients for the subblock of the block of video data.

Aspect 46: The computer-readable storage medium of Aspect 41, wherein the instructions that cause the one or more processors to determine the set of quantization offset parameters for the group of scaled transform coefficients for the block of video data comprise instructions that cause the one or more processors to: determine, based on the side information associated with the block of video data, a set of parameters for parametrization of the set of quantization offset parameters, the set of parameters having a smaller size than the set of quantization offset parameters; and determine the set of quantization offset parameters for group of scaled transform coefficients based on the set of parameters having the smaller size.

Aspect 47: The computer-readable storage medium of any one of Aspects 41 to 45, wherein the instructions that cause the one or more processors to determine the set of quantization offset parameters for the group of scaled transform coefficients for the block of video data comprise instructions that cause the one or more processors to: determine, using a neural network and based on the side information associated with the block of video data, the set of quantization offset parameters for the group of scaled transform coefficients for the block of video data.

Aspect 48: The computer-readable storage medium of Aspect 47, wherein the instructions that cause the one or more processors to determine the set of quantization offset parameters for the group of scaled transform coefficients for the block of video data comprise instructions that cause the one or more processors to: determine, using at least one of: a classification technique or a regression technique, the set of quantization offset parameters for the group of scaled transform coefficients for the block of video data.

Aspect 49: The computer-readable storage medium of any one of Aspects 41 to 48, wherein the instructions further cause the one or more processors to: divide a plurality of scaled transform coefficients of the block of video data into a plurality of groups of scaled transform coefficients associated with subblocks of the block of video data, wherein the plurality of groups of scaled transform coefficients include the group of scaled transform coefficients for the block of video data; wherein the instructions that cause the one or more processors to determine the set of quantization offset parameters for the group of scaled transform coefficients for the block of video data comprise instructions that cause the one or more processors to determine, for each of the plurality of groups of scaled transform coefficients, a corresponding set of quantization offset parameters; and wherein the instructions that cause the one or more processors to quantize the group of scaled transform coefficients for the block of video data comprise instructions that cause the one or more processors to quantize each of the plurality of groups of scaled transform coefficients based on the corresponding set of quantization offset parameters.

Aspect 50: The computer-readable storage medium of any one of Aspects 41 to 49, wherein the instructions that cause the one or more processors to quantize the group of scaled transform coefficients for the block of video data comprise instructions that cause the one or more processors to: determine, for each scaled transform coefficient of the group of scaled transform coefficients, a corresponding quantization offset parameter from the set of quantization offset parameters; and quantize each scaled transform coefficient of the group of scaled transform coefficients based at least in part on the corresponding quantization offset parameter.

Aspect 51: The computer-readable storage medium of any one of Aspects 41 to 50, wherein the side information includes one or more of: a slice type of the block of video data, block size of the block of video data, or an indication of whether the block of video data comprises a luminance component or a chrominance component.

Aspect 52: The computer-readable storage medium of any one of Aspects 41 to 51, wherein the instructions that cause the one or more processors to determine the set of quantization offset parameters for the group of scaled transform coefficients for the block of video data comprise instructions that cause the one or more processors to: determine the set of quantization offset parameters for the group of scaled transform coefficients for the block of video data without using one or more bit cost estimates determined via entropy coding.

Aspect 53: The computer-readable storage medium of any one of Aspects 41 to 52, wherein set of quantization offset parameters comprises quantization offset vectors.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
   determining a set of quantization offset parameters for a group of scaled transform coefficients for a block of video data based at least in part on side information associated with the block of video data;
   quantizing the group of scaled transform coefficients for the block of video data based at least in part on summing the group of scaled transform coefficients for the block with the set of quantization offset parameters to generate quantized transform coefficients for the block of video data; and
   generating an encoded video bitstream based at least in part on the quantized transform coefficients for the block of video data.

2. The method of claim 1, wherein determining the set of quantization offset parameters for the group of scaled transform coefficients for the block of video data comprises:
   selecting the set of quantization offset parameters for the group of scaled transform coefficients from a plurality of sets of quantization offset parameters based on the side information associated with the block of video data.

3. The method of claim 2, wherein selecting the set of quantization offset parameters for the group of scaled transform coefficients from the plurality of sets of quantization offset parameters comprises:
   determining an index associated with the group of scaled transform coefficients based at least in part on the side information associated with the block of video data; and
   indexing, using the index associated with the group of scaled transform coefficients, into the plurality of sets of quantization offset parameters to select the set of quantization offset parameters for the group of scaled transform coefficients.

4. The method of claim 2, wherein:
   the group of scaled transform coefficients comprises scaled transform coefficients for a subblock of the block of video data; and
   the side information associated with the block of video data comprises a location of the subblock within the block of video data and a block size of the block of video data.

5. The method of claim 4, wherein selecting the set of quantization offset parameters for the group of scaled transform coefficients from the plurality of sets of quantization offset parameters comprises:
   selecting the set of quantization offset parameters for the group of scaled transform coefficients from the plurality of sets of quantization offset parameters without using scaled transform coefficient values of the group of scaled transform coefficients for the subblock of the block of video data.

6. The method of claim 1, wherein determining the set of quantization offset parameters for the group of scaled transform coefficients for the block of video data comprises:
   determining, based on the side information associated with the block of video data, a set of parameters for parametrization of the set of quantization offset parameters, the set of parameters having a smaller size than the set of quantization offset parameters; and
   determining the set of quantization offset parameters for the group of scaled transform coefficients based on the set of parameters having the smaller size.

7. The method of claim 1, wherein determining the set of quantization offset parameters for the group of scaled transform coefficients for the block of video data further comprises:
   determining, using a neural network and based on the side information associated with the block of video data, the set of quantization offset parameters for the group of scaled transform coefficients for the block of video data.

8. The method of claim 7, wherein determining the set of quantization offset parameters for the group of scaled transform coefficients for the block of video data further comprises:
   determining, using at least one of: a classification technique or a regression technique, the set of quantization offset parameters for the group of scaled transform coefficients for the block of video data.

9. The method of claim 1, further comprising:
   dividing a plurality of scaled transform coefficients of the block of video data into a plurality of groups of scaled transform coefficients associated with subblocks of the block of video data, wherein the plurality of groups of scaled transform coefficients includes the group of scaled transform coefficients for the block of video data;
   wherein determining the set of quantization offset parameters for the group of scaled transform coefficients for the block of video data comprises determining, for each of the plurality of groups of scaled transform coefficients, a corresponding set of quantization offset parameters; and
   wherein quantizing the group of scaled transform coefficients for the block of video data includes quantizing each of the plurality of groups of scaled transform coefficients based on the corresponding set of quantization offset parameters.

10. The method of claim 1, wherein quantizing the group of scaled transform coefficients for the block of video data further comprises:
- determining, for each scaled transform coefficient of the group of scaled transform coefficients, a corresponding quantization offset parameter from the set of quantization offset parameters; and
- quantizing each scaled transform coefficient of the group of scaled transform coefficients based at least in part on the corresponding quantization offset parameter.

11. The method of claim 1, wherein the side information includes one or more of: a slice type of the block of video data, block size of the block of video data, or an indication of whether the block of video data comprises a luminance component or a chrominance component.

12. The method of claim 1, wherein determining the set of quantization offset parameters for the group of scaled transform coefficients for the block of video data comprises:
- determining the set of quantization offset parameters for the group of scaled transform coefficients for the block of video data without using one or more bit cost estimates determined via entropy coding.

13. The method of claim 1, wherein the set of quantization offset parameters comprises quantization offset vectors.

14. A device for encoding video data, the device comprising:
- a memory;
- processing circuitry in communication with the memory, the processing circuitry being configured to:
  - determine a set of quantization offset parameters for a group of scaled transform coefficients for a block of video data based on side information associated with the block of video data;
  - quantize the group of scaled transform coefficients for the block of video data based at least in part on summing the group of scaled transform coefficients for the block with the set of quantization offset parameters to generate quantized transform coefficients for the block of video data; and
  - generate an encoded video bitstream based at least in part on the quantized transform coefficients for the block of video data.

15. The device of claim 14, wherein to determine the set of quantization offset parameters for the group of scaled transform coefficients for the block of video data, the processing circuitry is further configured to:
- select the set of quantization offset parameters for the group of scaled transform coefficients from a plurality of sets of quantization offset parameters based on the side information associated with the block of video data.

16. The device of claim 15, wherein to select the set of quantization offset parameters for the group of scaled transform coefficients from the plurality of sets of quantization offset parameters, the processing circuitry is further configured to:
- determine an index associated with the group of scaled transform coefficients based at least in part on the side information associated with the block of video data; and
- index, using the index associated with the group of scaled transform coefficients, into the plurality of sets of quantization offset parameters to select the set of quantization offset parameters for the group of scaled transform coefficients.

17. The device of claim 15, wherein:
- the group of scaled transform coefficients comprises scaled transform coefficients for a subblock of the block of video data; and
- the side information associated with the block of video data comprises a location of the subblock within the block of video data and a block size of the block of video data.

18. The device of claim 17, wherein to select the set of quantization offset parameters for the group of scaled transform coefficients from the plurality of sets of quantization offset parameters, the processing circuitry is further configured to:
- select the set of quantization offset parameters for the group of scaled transform coefficients from the plurality of sets of quantization offset parameters without using scaled transform coefficient values of the group of scaled transform coefficients for the subblock of the block of video data.

19. The device of claim 14, wherein to determine the set of quantization offset parameters for the group of scaled transform coefficients for the block of video data, the processing circuitry is further configured to:
- determine, based on the side information associated with the block of video data, a set of parameters for parametrization of the set of quantization offset parameters, the set of parameters having a smaller size than the set of quantization offset parameters; and
- determine the set of quantization offset parameters for the group of scaled transform coefficients based on the set of parameters having the smaller size.

20. The device of claim 14, wherein to determine the set of quantization offset parameters for the group of scaled transform coefficients for the block of video data, the processing circuitry is further configured to:
- determine, using a neural network and based on the side information associated with the block of video data, the set of quantization offset parameters for the group of scaled transform coefficients for the block of video data.

21. The device of claim 20, wherein to determine the set of quantization offset parameters for the group of scaled transform coefficients for the block of video data, the processing circuitry is further configured to:
- determine, using at least one of: a classification technique or a regression technique, the set of quantization offset parameters for the group of scaled transform coefficients for the block of video data.

22. The device of claim 14, wherein the processing circuitry is further configured to:
- divide a plurality of scaled transform coefficients of the block of video data into a plurality of groups of scaled transform coefficients associated with subblocks of the block of video data, wherein the plurality of groups of scaled transform coefficients include the group of scaled transform coefficients for the block of video data;
- wherein to determine the set of quantization offset parameters for the group of scaled transform coefficients for the block of video data, the processing circuitry is further configured to determine, for each of the plurality of groups of scaled transform coefficients, a corresponding set of quantization offset parameters; and
- wherein quantizing the group of scaled transform coefficients for the block of video data includes quantizing each of the plurality of groups of scaled transform coefficients based on the corresponding set of quantization offset parameters.

23. The device of claim 14, wherein to quantize the group of scaled transform coefficients for the block of video data, the processing circuitry is further configured to:
   determine, for each scaled transform coefficient of the group of scaled transform coefficients, a corresponding quantization offset parameter from the set of quantization offset parameters; and
   quantize each scaled transform coefficient of the group of scaled transform coefficients based at least in part on the corresponding quantization offset parameter.

24. The device of claim 14, wherein the side information includes one or more of: a slice type of the block of video data, block size of the block of video data, or an indication whether the block of video data comprises a luminance component or a chrominance component.

25. The device of claim 14, wherein to determine the set of quantization offset parameters for the group of scaled transform coefficients for the block of video data, the processing circuitry is further configured to:
   determine the set of quantization offset parameters for the group of scaled transform coefficients for the block of video data without using one or more bit cost estimates determined via entropy coding.

26. The device of claim 14 wherein the set of quantization offset parameters comprises quantization offset vectors.

27. The device of claim 14, wherein the device comprises one or more of a camera, a computer, or a mobile device.

28. An apparatus for encoding video data, the apparatus comprising:
   means for determining a set of quantization offset parameters for a group of scaled transform coefficients for a block of video data based on side information associated with the block of video data;
   means for quantizing the group of scaled transform coefficients for the block of video data based at least in part on summing the group of scaled transform coefficients for the block with the set of quantization offset parameters to generate quantized transform coefficients for the block of video data; and
   means for generating an encoded video bitstream based at least in part on the quantized transform coefficients for the block of video data.

29. The apparatus of claim 28, wherein the means for determining the set of quantization offset parameters for the group of scaled transform coefficients for the block of video data further comprises:
   means for selecting the set of quantization offset parameters for the group of scaled transform coefficients from a plurality of sets of quantization offset parameters based on the side information associated with the block of video data.

30. The apparatus of claim 29, wherein the means for selecting the set of quantization offset parameters for the group of scaled transform coefficients from the plurality of sets of quantization offset parameters further comprises:
   means for determining an index associated with the group of scaled transform coefficients based at least in part on the side information associated with the block of video data; and
   means for indexing, using the index associated with the group of scaled transform coefficients, into the plurality of sets of quantization offset parameters to select the set of quantization offset parameters for the group of scaled transform coefficients.

31. The apparatus of claim 29, wherein:
   the group of scaled transform coefficients comprises scaled transform coefficients for a subblock of the block of video data; and
   the side information associated with the block of video data comprises a location of the subblock within the block of video data and a block size of the block of video data.

32. The apparatus of claim 31, wherein the means for selecting the set of quantization offset parameters for the group of scaled transform coefficients from the plurality of sets of quantization offset parameters further comprises:
   means for selecting the set of quantization offset parameters for the group of scaled transform coefficients from the plurality of sets of quantization offset parameters without using scaled transform coefficient values of the group of scaled transform coefficients for the subblock of the block of video data.

33. The apparatus of claim 28, wherein the means for determining the set of quantization offset parameters for the group of scaled transform coefficients for the block of video data further comprises:
   means for determining, based on the side information associated with the block of video data, a set of parameters for parametrization of the set of quantization offset parameters, the set of parameters having a smaller size than the set of quantization offset parameters; and
   means for determining the set of quantization offset parameters for the group of scaled transform coefficients based on the set of parameters having the smaller size.

34. The apparatus of claim 28, wherein the means for determining the set of quantization offset parameters for the group of scaled transform coefficients for the block of video data further comprises:
   means for determining, using a neural network and based on the side information associated with the block of video data, the set of quantization offset parameters for the group of scaled transform coefficients for the block of video data.

35. The apparatus of claim 34, wherein the means for determining the set of quantization offset parameters for the group of scaled transform coefficients for the block of video data comprises:
   means for determining, using at least one of: a classification technique or a regression technique, the set of quantization offset parameters for the group of scaled transform coefficients for the block of video data.

36. The apparatus of claim 28, further comprising:
   means for dividing a plurality of scaled transform coefficients of the block of video data into a plurality of groups of scaled transform coefficients associated with subblocks of the block of video data, wherein the plurality of groups of scaled transform coefficients include the group of scaled transform coefficients for the block of video data;
   wherein the means for determining the set of quantization offset parameters for the group of scaled transform coefficients for the block of video data comprises means for determining, for each of the plurality of groups of scaled transform coefficients, a corresponding set of quantization offset parameters;
   wherein the means for quantizing the group of scaled transform coefficients for the block of video data further includes means for quantizing each of the plurality of groups of scaled transform coefficients based on the corresponding set of quantization offset parameters.

37. The apparatus of claim 28, wherein the means for quantizing the group of scaled transform coefficients for the block of video data further comprises:

means for determining, for each scaled transform coefficient of the group of scaled transform coefficients, a corresponding quantization offset parameter from the set of quantization offset parameters; and means for quantizing each scaled transform coefficient of the group of scaled transform coefficients based at least in part on the corresponding quantization offset parameter.

38. The apparatus of claim 28, wherein the side information includes one or more of: a slice type of the block of video data, block size of the block of video data, or an indication of whether the block of video data comprises a luminance component or a chrominance component.

39. The apparatus of claim 28, wherein the means for determining the set of quantization offset parameters for the group of scaled transform coefficients for the block of video data comprises:

means for determining the set of quantization offset parameters for the group of scaled transform coefficients for the block of video data without using one or more bit cost estimates determined via entropy coding.

40. The apparatus of claim 28, wherein the set of quantization offset parameters comprises quantization offset vectors.

41. A computer-readable storage medium having stored thereon instructions that, when executed, cause one or more processors to:

determine a set of quantization offset parameters for a group of scaled transform coefficients for a block of video data based on side information associated with the block of video data;

quantize the group of scaled transform coefficients for the block of video data based at least in part on summing the group of scaled transform coefficients for the block with the set of quantization offset parameters to generate quantized transform coefficients for the block of video data; and generate an encoded video bitstream based at least in part on the quantized transform coefficients for the block of video data.

42. The computer-readable storage medium of claim 41, wherein the instructions that cause the one or more processors to determine the set of quantization offset parameters for the group of scaled transform coefficients for the block of video data comprise instructions that cause the one or more processors to:

select the set of quantization offset parameters for the group of scaled transform coefficients from a plurality of sets of quantization offset parameters based on the side information associated with the block of video data.

43. The computer-readable storage medium of claim 42, wherein the instructions that cause the one or more processors to select the set of quantization offset parameters for the group of scaled transform coefficients from the plurality of sets of quantization offset parameters comprise instructions that cause the one or more processors to:

determine an index for the group of scaled transform coefficients based at least in part on the side information associated with the block of video data; and index, using the index, into the plurality of sets of quantization offset parameters to select the set of quantization offset parameters for the group of scaled transform coefficients.

44. The computer-readable storage medium of claim 42, wherein:

the group of scaled transform coefficients comprises scaled transform coefficients for a subblock of the block of video data; and the side information associated with the block of video data comprises a location of the subblock within the block of video data and a block size of the block of video data.

45. The computer-readable storage medium of claim 44, wherein the instructions that cause the one or more processors to select the set of quantization offset parameters for the group of scaled transform coefficients from the plurality of sets of quantization offset parameters comprise instructions that cause the one or more processors to:

select the set of quantization offset parameters for the group of scaled transform coefficients from the plurality of sets of quantization offset parameters without using scaled transform coefficient values of the group of scaled transform coefficients for the subblock of the block of video data.

46. The computer-readable storage medium of claim 41, wherein the instructions that cause the one or more processors to determine the set of quantization offset parameters for the group of scaled transform coefficients for the block of video data comprise instructions that cause the one or more processors to:

determine, based on the side information associated with the block of video data, a set of parameters for parametrization of the set of quantization offset parameters, the set of parameters having a smaller size than the set of quantization offset parameters; and determine the set of quantization offset parameters for group of scaled transform coefficients based on the set of parameters having the smaller size.

47. The computer-readable storage medium of claim 41, wherein the instructions that cause the one or more processors to determine the set of quantization offset parameters for the group of scaled transform coefficients for the block of video data comprise instructions that cause the one or more processors to:

determine, using a neural network and based on the side information associated with the block of video data, the set of quantization offset parameters for the group of scaled transform coefficients for the block of video data.

48. The computer-readable storage medium of claim 47, wherein the instructions that cause the one or more processors to determine the set of quantization offset parameters for the group of scaled transform coefficients for the block of video data comprise instructions that cause the one or more processors to:

determine, using at least one of: a classification technique or a regression technique, the set of quantization offset parameters for the group of scaled transform coefficients for the block of video data.

49. The computer-readable storage medium of claim 41, wherein the instructions further cause the one or more processors to:
- divide a plurality of scaled transform coefficients of the block of video data into a plurality of groups of scaled transform coefficients associated with subblocks of the block of video data, wherein the plurality of groups of scaled transform coefficients include the group of scaled transform coefficients for the block of video data;
- wherein the instructions that cause the one or more processors to determine the set of quantization offset parameters for the group of scaled transform coefficients for the block of video data comprise instructions that cause the one or more processors to determine, for each of the plurality of groups of scaled transform coefficients, a corresponding set of quantization offset parameters; and
- wherein the instructions that cause the one or more processors to quantize the group of scaled transform coefficients for the block of video data comprise instructions that cause the one or more processors to quantize each of the plurality of groups of scaled transform coefficients based on the corresponding set of quantization offset parameters.

50. The computer-readable storage medium of claim 41, wherein the instructions that cause the one or more processors to quantize the group of scaled transform coefficients for the block of video data comprise instructions that cause the one or more processors to:
- determine, for each scaled transform coefficient of the group of scaled transform coefficients, a corresponding quantization offset parameter from the set of quantization offset parameters; and
- quantize each scaled transform coefficient of the group of scaled transform coefficients based at least in part on the corresponding quantization offset parameter.

51. The computer-readable storage medium of claim 41, wherein the side information includes one or more of: a slice type of the block of video data, block size of the block of video data, or an indication of whether the block of video data comprises a luminance component or a chrominance component.

52. The computer-readable storage medium of claim 41, wherein the instructions that cause the one or more processors to determine the set of quantization offset parameters for the group of scaled transform coefficients for the block of video data comprise instructions that cause the one or more processors to:
- determine the set of quantization offset parameters for the group of scaled transform coefficients for the block of video data without using one or more bit cost estimates determined via entropy coding.

53. The computer-readable storage medium of claim 41, wherein the set of quantization offset parameters comprises quantization offset vectors.

* * * * *